(12) United States Patent
Heimerdinger

(10) Patent No.: US 11,523,475 B2
(45) Date of Patent: Dec. 6, 2022

(54) LAMP SYNCHRONIZATION FOR COOKING APPLIANCE MEAL COOK CYCLE

(71) Applicant: Haier US Appliance Solutions, Inc., Wilmington, DE (US)

(72) Inventor: Mark Heimerdinger, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 466 days.

(21) Appl. No.: 16/836,243

(22) Filed: Mar. 31, 2020

(65) Prior Publication Data

US 2021/0307134 A1 Sep. 30, 2021

(51) Int. Cl.
  *H05B 6/68* (2006.01)
  *H05B 6/64* (2006.01)
  *A21B 1/14* (2006.01)

(52) U.S. Cl.
  CPC .............. *H05B 6/68* (2013.01); *H05B 6/6411* (2013.01); *H05B 6/6473* (2013.01)

(58) Field of Classification Search
  CPC .......................... C12N 15/85; C12N 2830/00; C12N 2830/30; C12N 2830/85; C12N 15/1034; C12N 15/113; C12N 15/67; C12N 2999/005; C12Q 1/6804; C12Q 1/6869; C12Q 1/6897; C12Q 1/6883; C12Q 2600/156; A61K 31/551; A61K 48/0066; A61P 35/00; H05B 6/6411; H05B 6/6473; H05B 6/6485; H05B 6/68; Y02B 40/00

USPC ....... 219/702, 680, 681, 685, 697, 705, 711, 219/725, 748, 749, 756, 758, 761, 411, 219/385, 386, 387, 214, 405
See application file for complete search history.

(56) References Cited

U.S. PATENT DOCUMENTS

| | | | |
|---|---|---|---|
| 5,990,454 A | 11/1999 | Westerberg et al. | |
| 6,528,772 B1 * | 3/2003 | Graves ................. | H05B 6/6435 392/416 |
| 6,815,644 B1 | 11/2004 | Muegge et al. | |
| 7,133,739 B2 | 11/2006 | Williamson et al. | |
| 8,173,942 B2 | 5/2012 | Wiseman et al. | |
| 8,766,151 B1 | 7/2014 | Weber | |
| 10,223,933 B1 | 3/2019 | Cheng et al. | |
| 2007/0045303 A1 | 3/2007 | Smith | |
| 2009/0236332 A1 | 9/2009 | Adams | |
| 2010/0193507 A1 * | 8/2010 | Zimmer ............... | H05B 6/6485 219/681 |
| 2017/0223774 A1 | 8/2017 | Cheng et al. | |
| 2019/0139446 A1 | 5/2019 | Cheng et al. | |

FOREIGN PATENT DOCUMENTS

| | | |
|---|---|---|
| CN | 1779368 A | 5/2006 |
| CN | 109539337 A | 3/2019 |
| DE | 19845165 A1 | 4/2000 |

(Continued)

*Primary Examiner* — Quang T Van
(74) *Attorney, Agent, or Firm* — Dority & Manning, P.A.

(57) ABSTRACT

A method of operating cooking appliance includes activating a motor to rotate a turntable within a cooking cavity defined in a casing of the cooking appliance. The methods also includes activating a cooking lamp in response to the turntable reaching a first angular position after activating the motor to rotate the turntable and deactivating the cooking lamp in response to the turntable reaching a second angular position after the first angular position.

20 Claims, 33 Drawing Sheets

(56) References Cited

FOREIGN PATENT DOCUMENTS

| | | |
|---|---|---|
| JP | 2002048347 A | 2/2002 |
| KR | 920006924 B1 | 8/1992 |
| KR | 101192349 B1 | 10/2012 |
| WO | WO2013127897 A1 | 9/2013 |

\* cited by examiner

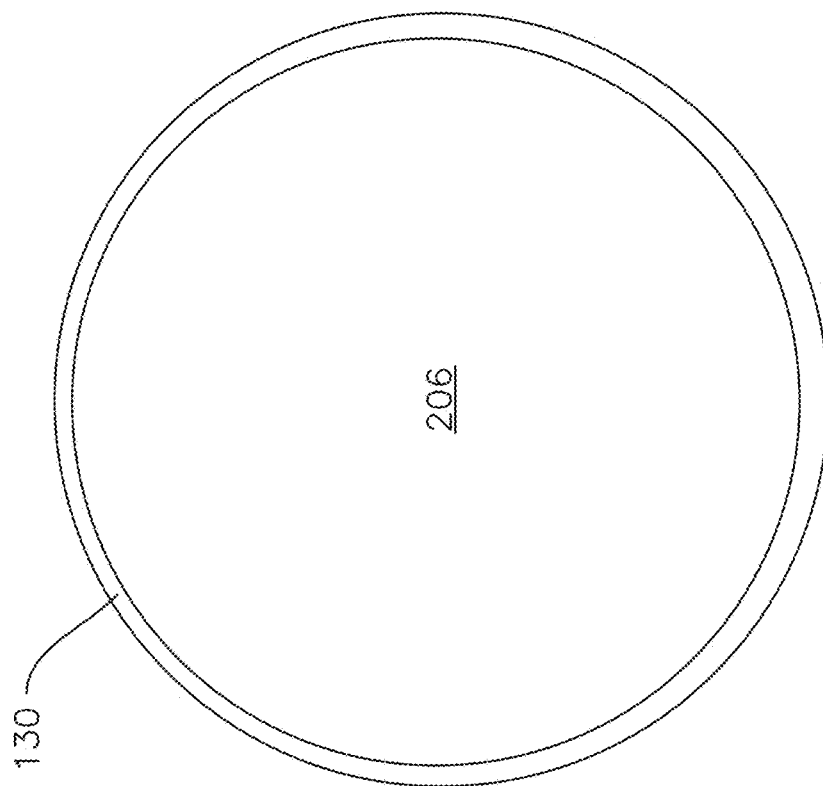
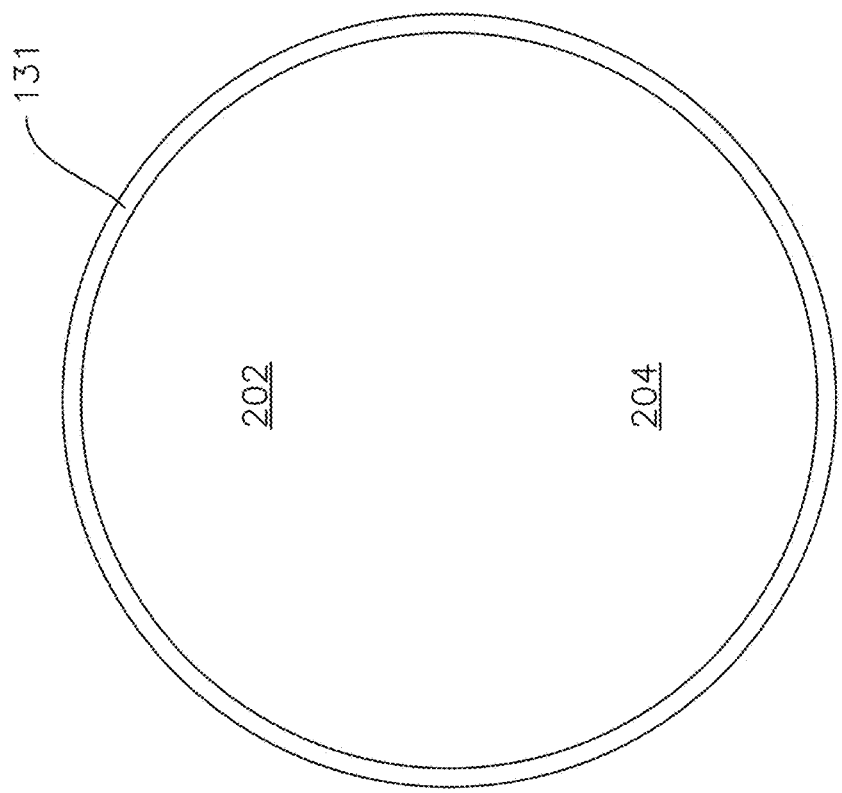
Fig. 4

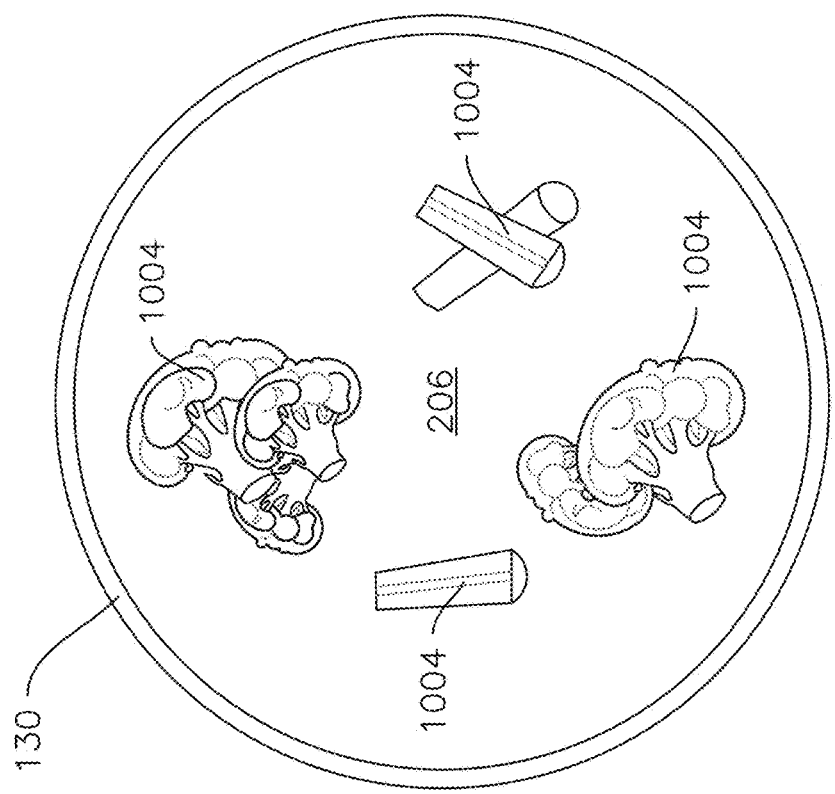
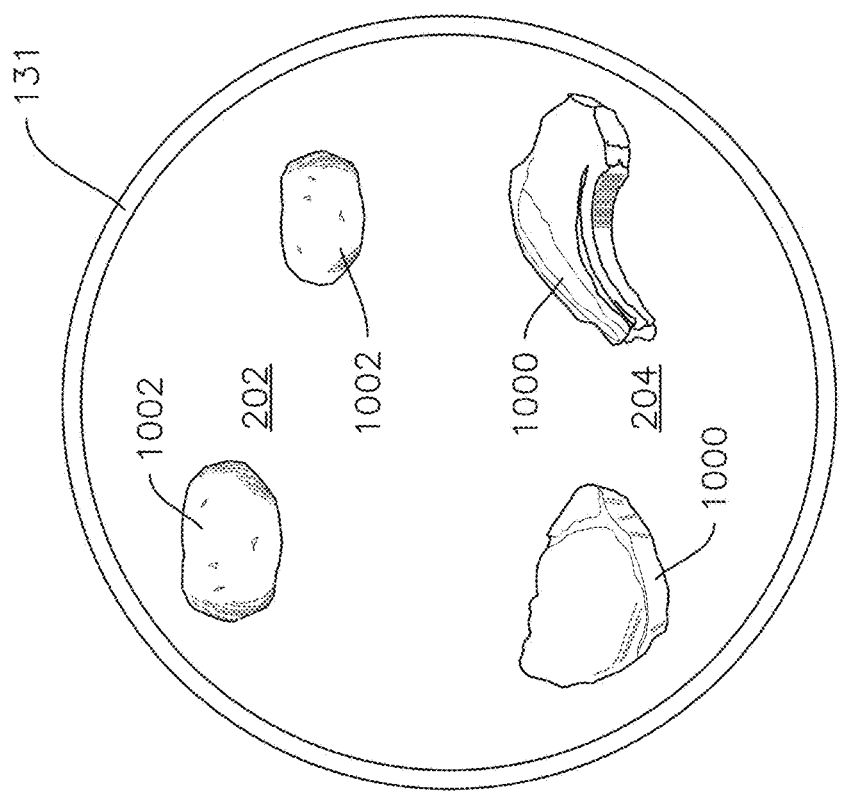
Fig. 6

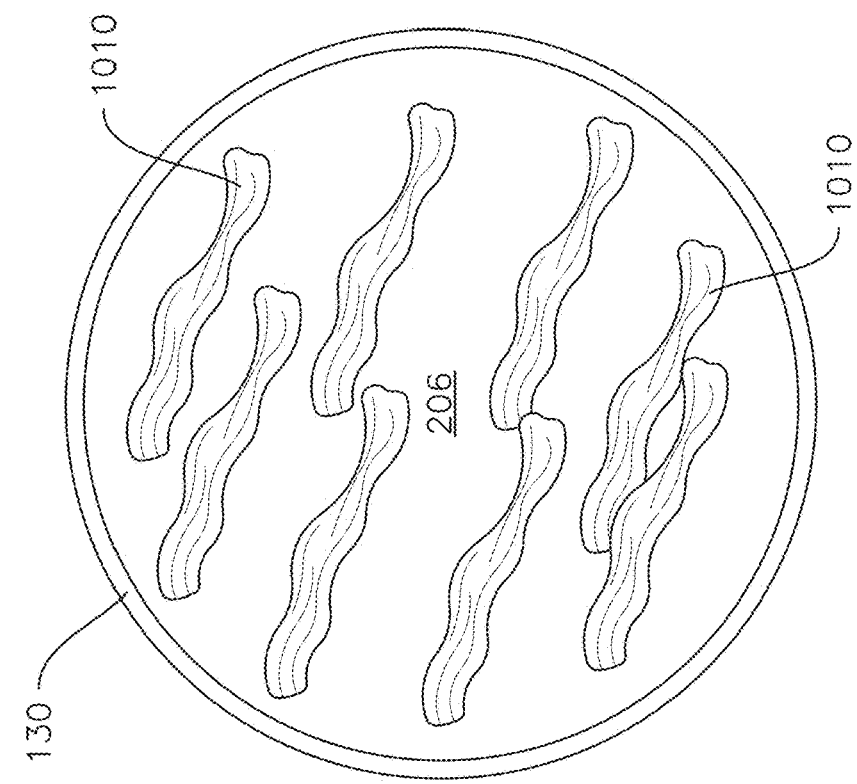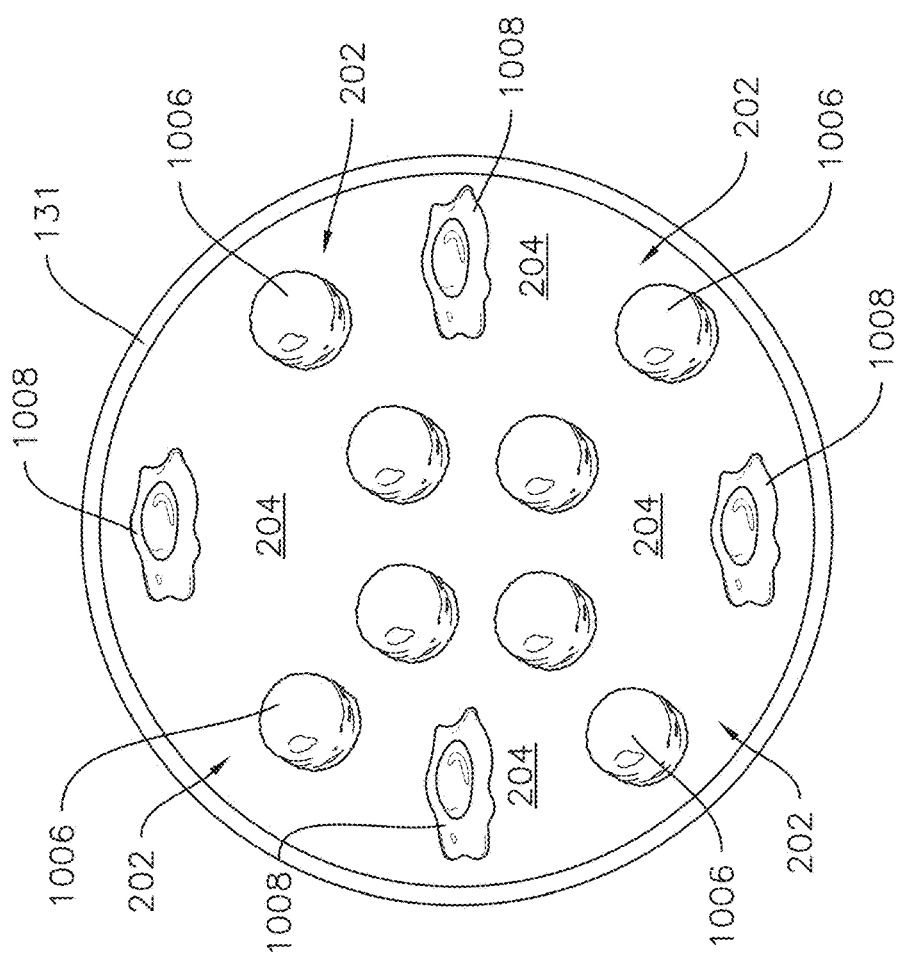
Fig. 8

LAMP SYNCHRONIZATION FOR COOKING APPLIANCE MEAL COOK CYCLE

FIELD OF THE INVENTION

The subject matter of the present disclosure relates generally to cooking appliances, and more particularly to cooking appliances operable to cook an entire meal in a single cycle.

BACKGROUND OF THE INVENTION

A full meal or entire meal typically includes diverse types of food with diverse cooking requirements. The optimal or preferred cooking conditions or operations for each type of food may include different cooking times, different temperatures or other parameters, and even different energy sources. For example, an entire meal may include a meat, a starch, e.g., potatoes, and vegetables. One type of food, e.g., the vegetables and/or potatoes, may be optimally prepared using microwave energy, while another, e.g., the meat, may be optimally prepared using radiant and/or convective heat energy. Additionally, even when foods use the same energy source, the exposure time may vary, for example, the vegetables and potatoes may both be cooked with microwave energy, but the vegetables may require much less time. Further, some foods may require multiple energy sources for optimal preparation, such as potatoes may be most efficiently prepared by first exposing them to microwave energy to hasten the initial cooking process, then exposing them to radiant heat energy to complete the cooking process.

Thus, cooking an entire meal typically requires the use of multiple appliances and/or multiple operations with the same appliance. Referring again to the foregoing example meal, the potatoes may be started in a microwave appliance and then moved to an oven appliance, while the meat may be cooked on a cooktop appliance and/or in the oven appliance, and the vegetables may be prepared in the microwave appliance separately from the potatoes. Such complex operations requiring separate but simultaneous and/or overlapping operations in different appliances and/or multiple distinct operations of the same appliance increase the time and difficulty in preparing an entire meal.

Accordingly, a cooking appliance and method for operating the same that address one or more of the challenges noted above would be desirable.

BRIEF DESCRIPTION OF THE INVENTION

Aspects and advantages of the invention will be set forth in part in the following description, or may be apparent from the description, or may be learned through practice of the invention.

In one exemplary embodiment, a cooking appliance is provided. The cooking appliance includes a casing defining a cooking cavity. The cooking appliance also includes a microwave module for delivering microwave energy into the cooking cavity. The cooking appliance further includes at least one secondary heat source for delivering thermal energy into the cooking cavity. A turntable is rotatably mounted in the cooking cavity. An upper pan is mounted above the turntable. The turntable and the upper pan are configured for positioning a plurality of food items thereon in a predetermined food arrangement. The plurality of food items collectively make up a meal. A motor is operatively coupled to the turntable to rotate the turntable and the upper pan within the cooking cavity. As a result, differing amounts of energy are provided to each food item of the plurality of food items based on a spatial location of each food item in the predetermined food arrangement on the turntable and the upper pan during a meal cook cycle.

In another exemplary embodiment, a cooking appliance is provided. The cooking appliance includes a casing defining a cooking cavity and a microwave module for delivering microwave energy into the cooking cavity. A turntable is rotatably mounted in the cooking cavity. An upper pan is mounted above the turntable. A motor is operatively coupled to the turntable to rotate the turntable and the upper pan within the cooking cavity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 4 provides a plan view of cooking utensils usable in a cooking appliance according to one or more example embodiments of the present subject matter.

FIG. 6 provides a view of a plurality of food items arranged in multiple distinct spatial locations within the cooking appliance according to one or more example embodiments of the present subject matter.

FIG. 8 provides a view of a plurality of food items arranged in multiple distinct spatial locations within the cooking appliance according to one or more additional example embodiments of the present subject matter.

DETAILED DESCRIPTION

Figure 1:
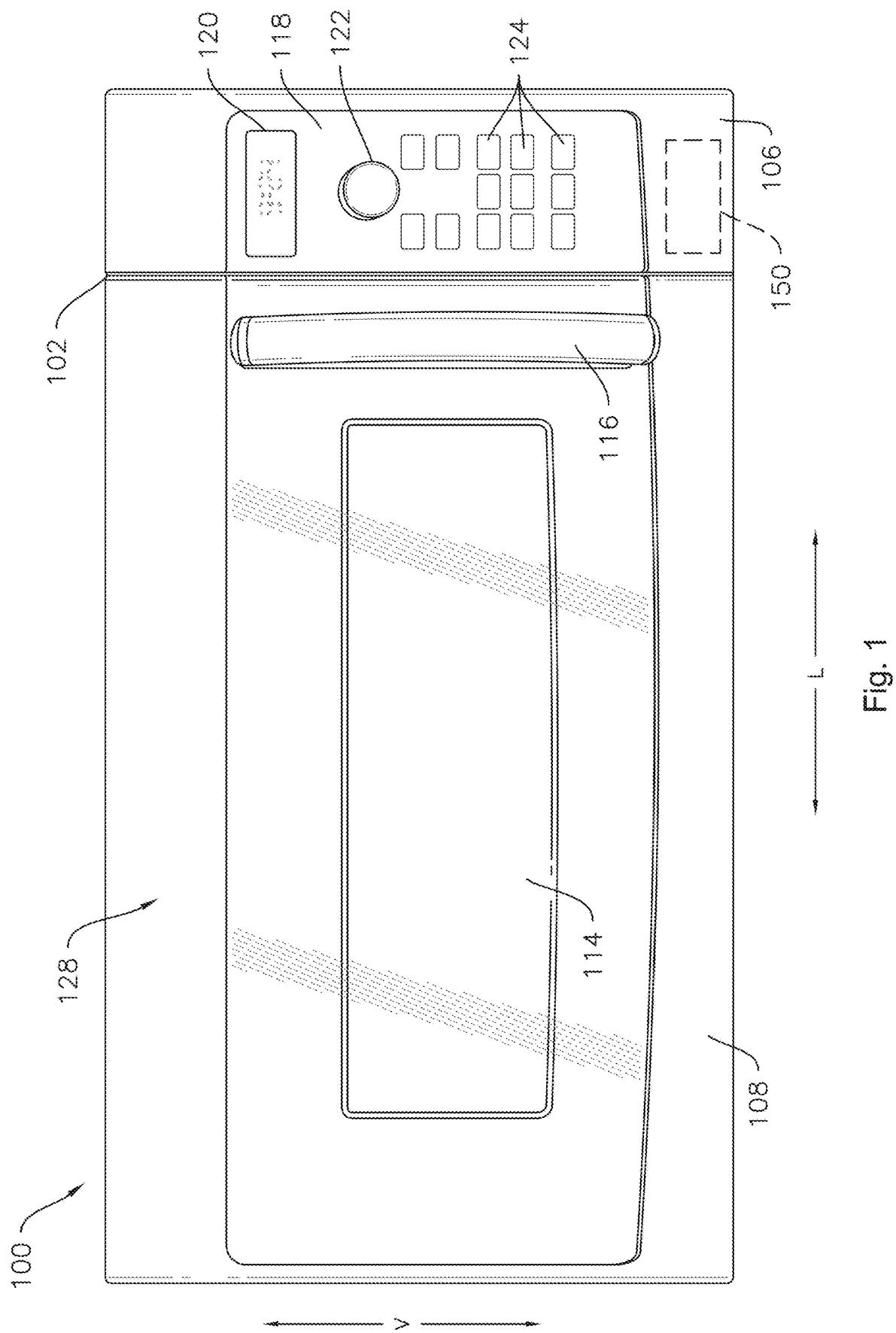
FIG. 1 provides a front view of a cooking appliance according to one or more example embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components.

FIG. 1 provides a front view of a cooking appliance 100 according to an example embodiment of the present subject matter. Cooking appliance 100 may, in some example embodiments, be an "over-the-range" oven. In other example embodiments, the cooking appliance 100 may be a countertop oven, a wall oven, or may be provided in various other oven configurations as will be recognized by those of skill in the art.

Cooking appliance 100 includes a housing or casing 102 that defines a cooking cavity 128. Food items can be received within cooking cavity 128. A door 108 is rotatably mounted to casing 102 and is movable between an open position and a closed position (shown in FIG. 1) to provide selective access to cooking cavity 128. A window 114 in door 108 is provided for viewing food items in the cooking cavity 128, and a handle 116 is secured to door 108. Handle 116 can be formed of plastic, for example, and can be injection molded.

Figure 2:
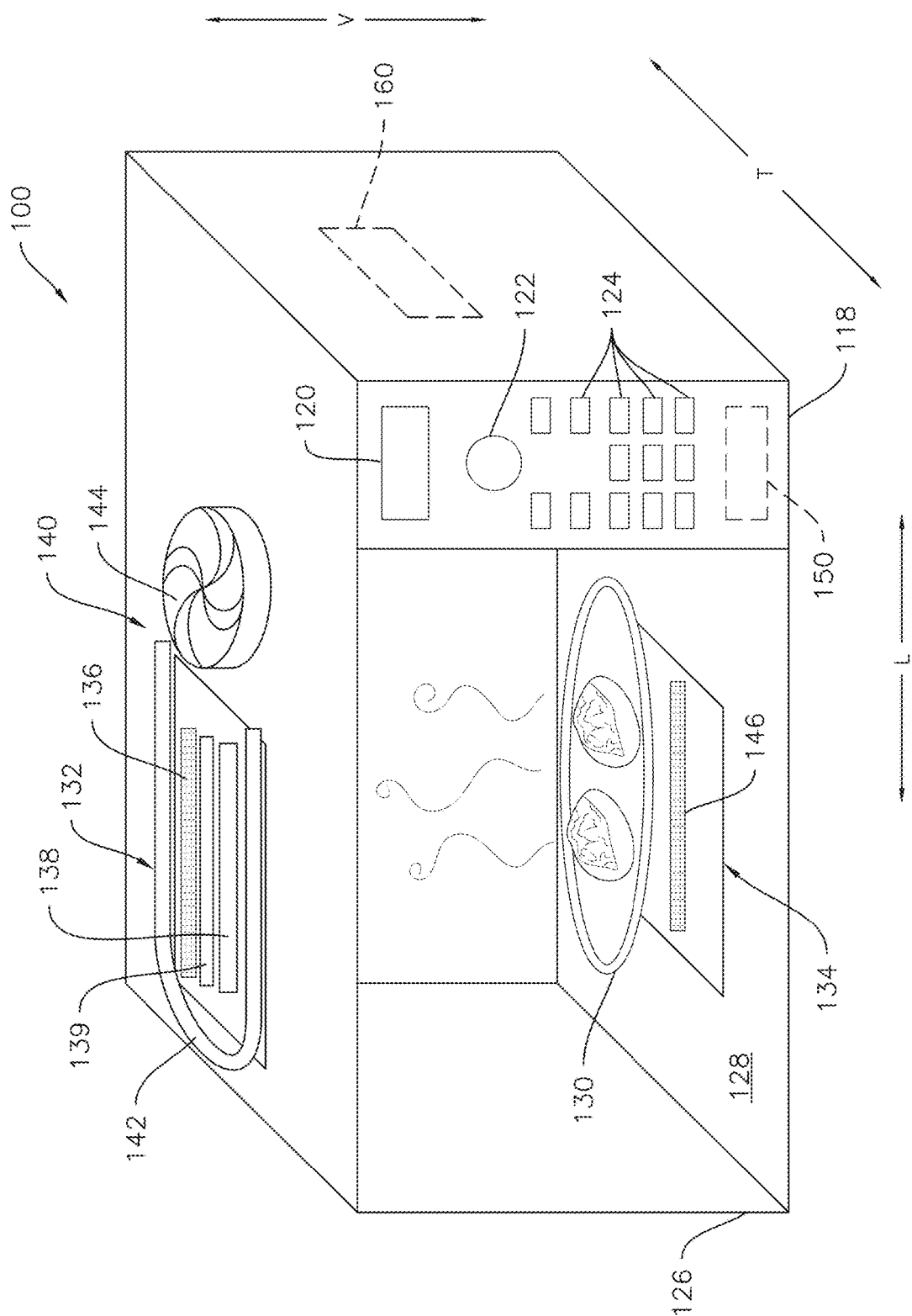
FIG. 2 provides a schematic perspective view of a cooking appliance according to one or more example embodiments of the present subject matter.
Figure 3:
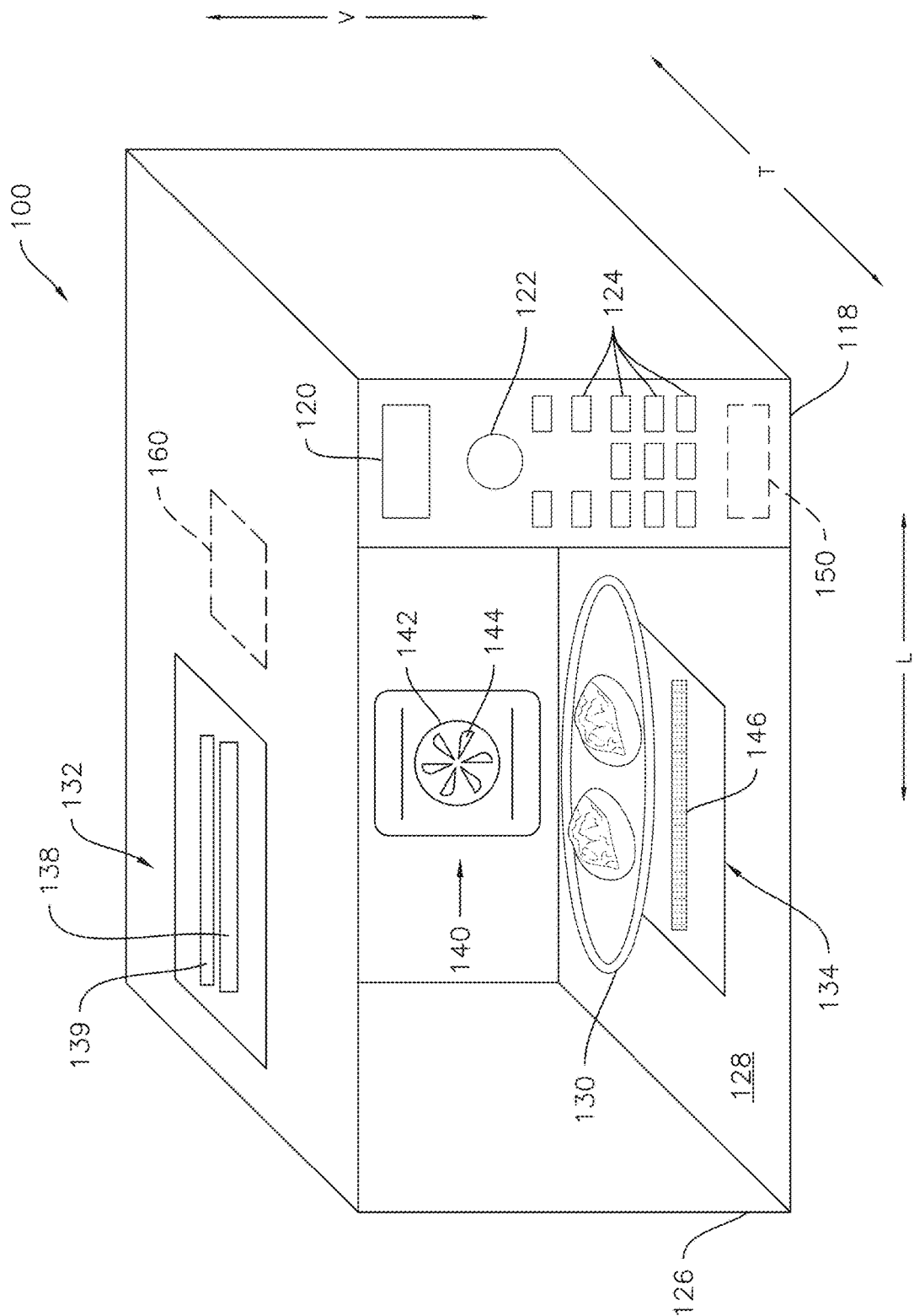
FIG. 3 provides a schematic perspective view of a cooking appliance according to one or more additional example embodiments of the present subject matter.

As may be seen, e.g., in FIGS. 1 through 3, the cooking appliance 100 may define a vertical direction V, a lateral direction L, and a transverse direction T. The vertical direction V, the lateral direction L, and the transverse direction T may be mutually perpendicular. In particular, the cooking appliance 100 may extend between a top and a bottom along the vertical direction, between a left side and a right side along the lateral direction L, and between a front and a back along the transverse direction T. For example, "front," "back," "left," and "right" may be defined from the perspective of a user standing in front of the cooking appliance 100 to access the cooking cavity 128 therein, e.g., via the door 108.

Cooking appliance 100 also includes a control panel frame 106. A control panel 118 is mounted within control panel frame 106. Control panel 118 includes a display device 120 for presenting various information to a user. Control panel 118 also includes one or more input devices. For this embodiment, the input devices of control panel 118 include a knob or dial 122 and tactile control buttons 124. Selections are made by rotating dial 122 clockwise or counter-clockwise, and when the desired selection is displayed, pressing dial 122. For example, many meal cook cycles and other cooking algorithms can be preprogrammed in or loaded onto a memory device of a controller 150 of cooking appliance 100 for many different food items types (e.g., pizza, fried chicken, French fries, potatoes, etc.), including simultaneous preparation of a group of food items of different food types comprising an entire meal. Additionally, new or updated meal cook cycles and/or recipes may be downloaded to the memory device of the controller 150, such as from a remote database, e.g., a cloud server, via a network communications module of the controller 150 and stored in the memory device. When a user is cooking a particular food item or group of food items for which there is a stored or preprogrammed cooking algorithm or recipe (including cooking algorithms or recipes which are downloaded from the internet or cloud), the cooking algorithm can be selected by rotating dial 122 until the selected food name is displayed and then pressing dial 122. Instructions and selections are displayed on display device 120. Furthermore, in some embodiments, display device 120 can also be used as an input device. For instance, in such embodiments, display device 120 can be a touchscreen device. In some embodiments, display device 120 is the only input device of control panel 118.

FIG. 2 provides a schematic view of cooking appliance 100 in one or more example embodiments and FIG. 3 provides a schematic view of cooking appliance 100 in one or more additional example embodiments. As shown in FIGS. 2 and 3, in some example embodiments, casing 102 (FIG. 1) of cooking appliance 100 includes a shell 126. Shell 126 of casing 102 delineates the interior volume of cooking cavity 128. The walls of shell 126 may be constructed using high reflectivity (e.g., 72% reflectivity) stainless steel. A turntable 130 is located in cooking cavity 128 and is rotatable about an axis of rotation, e.g., for rotating food items during a cooking operation.

Further, cooking appliance 100 includes a microwave module 160, an upper heater module 132, a lower heater module 134, and a convection module 140. In the example embodiment of FIG. 2, the convection module 140 is positioned above the cooking cavity 128. FIG. 3 schematically illustrates an additional example embodiment of the cooking appliance 100, where the convection module 140 (including sheath 142 and convection fan 144) is provided at a back of the cooking cavity 128. In some embodiments, microwave module 160 is located on a side of cooking cavity 128 (e.g., as illustrated in FIG. 2), while in other example embodiments, the microwave module 160 may be located above the cooking cavity 128 (e.g., as illustrated in FIG. 3). The microwave module 160 delivers microwave energy into cooking cavity 128. In some embodiments, the microwave module 160 includes a magnetron to provide the microwave energy. In other embodiments, the microwave module 160 may also or instead include a solid-state radio frequency device, e.g., a low-voltage printed circuit board with semiconductors embedded therein which output microwave energy at various frequencies and power output levels. Upper heater module 132 can include one or more heating elements. For instance, upper heating module 132 can include one or more halogen cooking lamps and/or one or more ceramic heaters. For the depicted embodiment of FIG. 2, upper heating module 132 includes a ceramic heater 136 and a halogen cooking lamp 138. In some example embodiments, upper heater module 132 has at least two halogen lamps 138, 139 configured to deliver radiant and thermal energy into the cooking cavity 128, such as in the example embodiment depicted in FIG. 3.

Convection module 140 includes a sheath heater 142 and a convection fan 144. Convection fan 144 is provided for blowing or otherwise moving air over sheath heater 142 of convection module 140 and into cooking cavity 128, e.g., for convection cooking. Lower heater module 134 includes at least one heating element. The heating element of lower heater module 134 can be a ceramic heater or a halogen lamp, for example. For the example embodiments illustrated in FIGS. 2 and 3, the heating element of lower heater module 134 is illustrated as a ceramic heater 146. In various embodiments, cooking appliance 100 may be a 240V cooking appliance or a 120V cooking appliance, for example.

The specific heating elements of upper and lower heater modules 132, 134, convection module 140, and radio frequency (RF) generation system of microwave module 160 (e.g., a magnetron or solid state RF generation system) can vary from embodiment to embodiment, and the elements and systems described above are exemplary only. For example, the upper heater module 132 can include any combination of heaters including combinations of halogen lamps, ceramic lamps, and/or sheath heaters. Similarly, lower heater module 134 can include any combination of heaters including combinations of halogen lamps, ceramic lamps, and/or sheath heaters. In addition, the heaters can all be one type of heater. The specific ratings and number of lamps and/or heaters utilized in the upper and lower modules 132, 134 and convection module 140 can vary from embodiment to embodiment. Generally, the combinations of lamps, heaters, and RF generation system is selected to provide the desired cooking characteristics for precision cooking in various modes and/or operations.

As shown in FIGS. 1 and 2, cooking appliance 100 includes controller 150. Controller 150 of cooking appliance 100 can include one or more processor(s) and one or more memory device(s). The processor(s) of controller 150 can be any suitable processing device, such as a microprocessor, microcontroller, integrated circuit, or other suitable processing device. The memory device(s) of controller 150 can include any suitable computing system or media, including, but not limited to, non-transitory computer-readable media, RAM, ROM, hard drives, flash drives, or other memory devices. The memory device(s) of controller 150 can store information accessible by the processor(s) of controller 150 including instructions that can be executed by the processor(s) of controller 150 in order to execute various cooking operations or cycles, e.g., a meal cook cycle. Controller 150 is communicatively coupled with various operational components of cooking appliance 100, such as components of microwave module 160, upper heater module 132, lower heater module 134, convection module 140, and control panel 118, including display device 120, dial 122, the various control buttons 124, etc. Input/output ("I/O") signals may be routed between controller 150 and control panel 118 as well as other operational components of cooking appliance 100. Controller 150 can execute and control cooking appliance 100 in various cooking operations or cycles, such as precision cooking, which includes meal cook, microwave, and convection/bake modes.

Cooking appliance 100 can operate in various modes or cycles, and the descriptions set forth herein are exemplary only. In addition, operation and use of cooking appliance 100 is not limited to a specific order of steps. Various steps can be performed in orders different from the exemplary order described below.

In some embodiments, the cooking appliance 100 may be operable in one or more convection/bake modes. In one example convection/bake mode, a user selects "Convection/Bake" from control panel 118, and then uses dial 122 to select a temperature and cook time. Lower ceramic heater 146 and sheath heater 142 are then energized to preheat the air in cooking cavity 128. The food is then placed in cooking cavity 128 and cooking begins. During the cooking cycle, convection fan 144 circulates air to assure even cooking. Controller 150 can activate convection fan 144 (e.g., via one or more command signals) such that convection fan 144 moves air over sheath heater 142, and in some embodiments heating elements of upper heater module 132. In this way, heated air is moved into cooking cavity 128, e.g., for convection cooking.

Cooking appliance 100 may also operate in one or more microwave modes, for example a microwave only mode, or the microwave module 160 may operate in conjunction with one or more various other heating modules in other modes. Generally, for the modes which utilize microwave module 160, the user places food in cooking cavity 128 on turntable 130. The user then selects "Microwave," "Express," or other applicable cooking mode (e.g., a meal cook mode which utilizes the microwave module in conjunction with other heating modules, as described in more detail below) from control panel 118. Dial 122 can be utilized to select a food type, and once the food type is selected, the user selects "Start" from control panel 118. The microwave module 160 is then energized in accordance with the user selections. In some embodiments, the user can select the desired cook time and power level and then may select "START" to commence the microwave only cooking operation.

In some embodiments, such as the meal cook cycle described in more detail below, the cooking appliance 100 may operate one or more of the convection module 140, the lower heating module 134, the upper heating module 132, and the microwave module 160 in various combinations during a single cycle. For example, some embodiments of the meal cook cycle may include operating two or more of the modules at various times, sequentially and/or simultaneously, during a single meal cook cycle. Such a cycle may be advantageous in order to, for example, optimize the exposure of various food items to the different heat sources and thereby efficiently prepare an entire meal in a single cycle.

Figure 5:
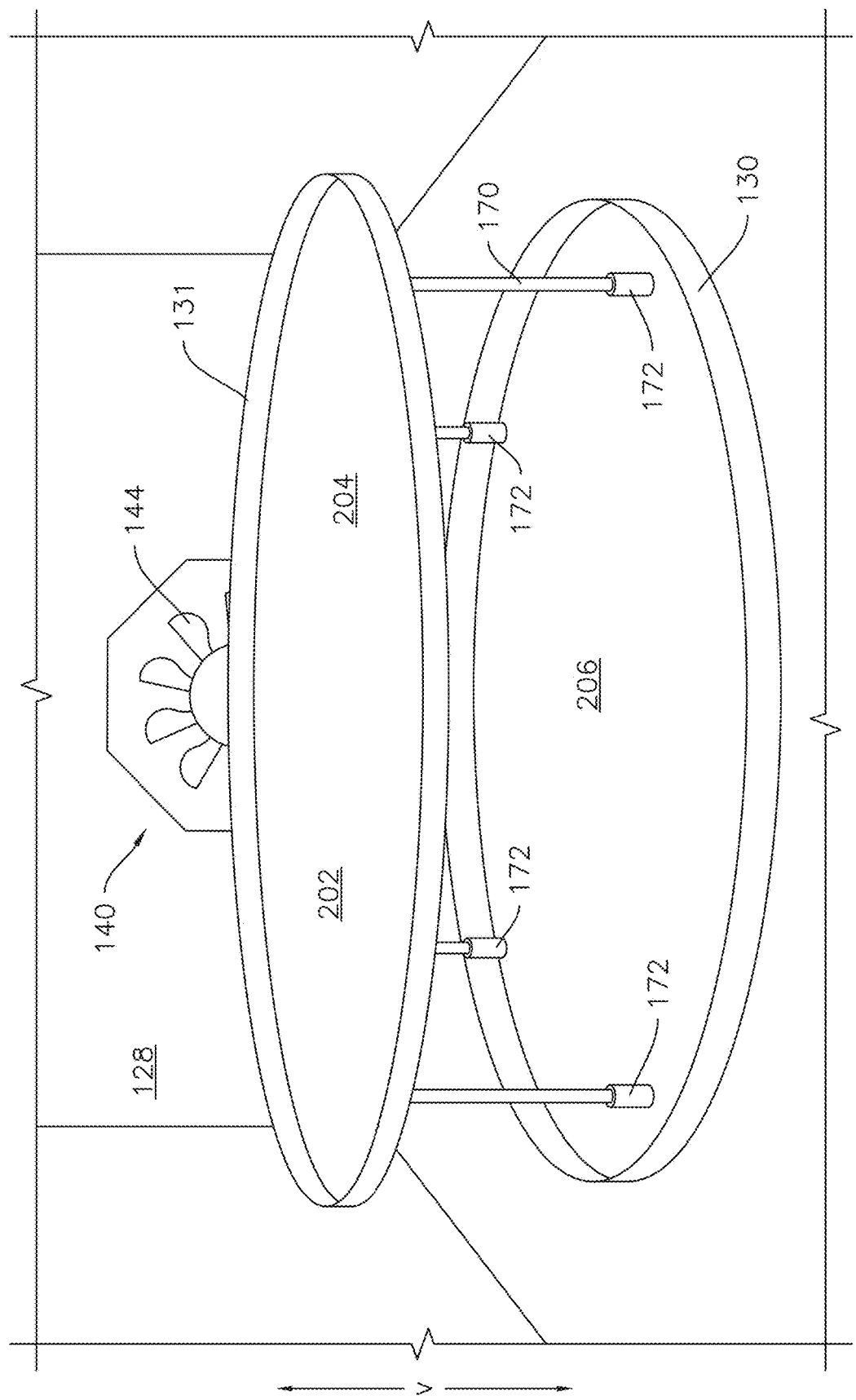
FIG. 5 provides a perspective view of the cooking utensils of FIG. 4 positioned within the cooking cavity of a cooking appliance according to one or more example embodiments of the present subject matter.
Figure 17:
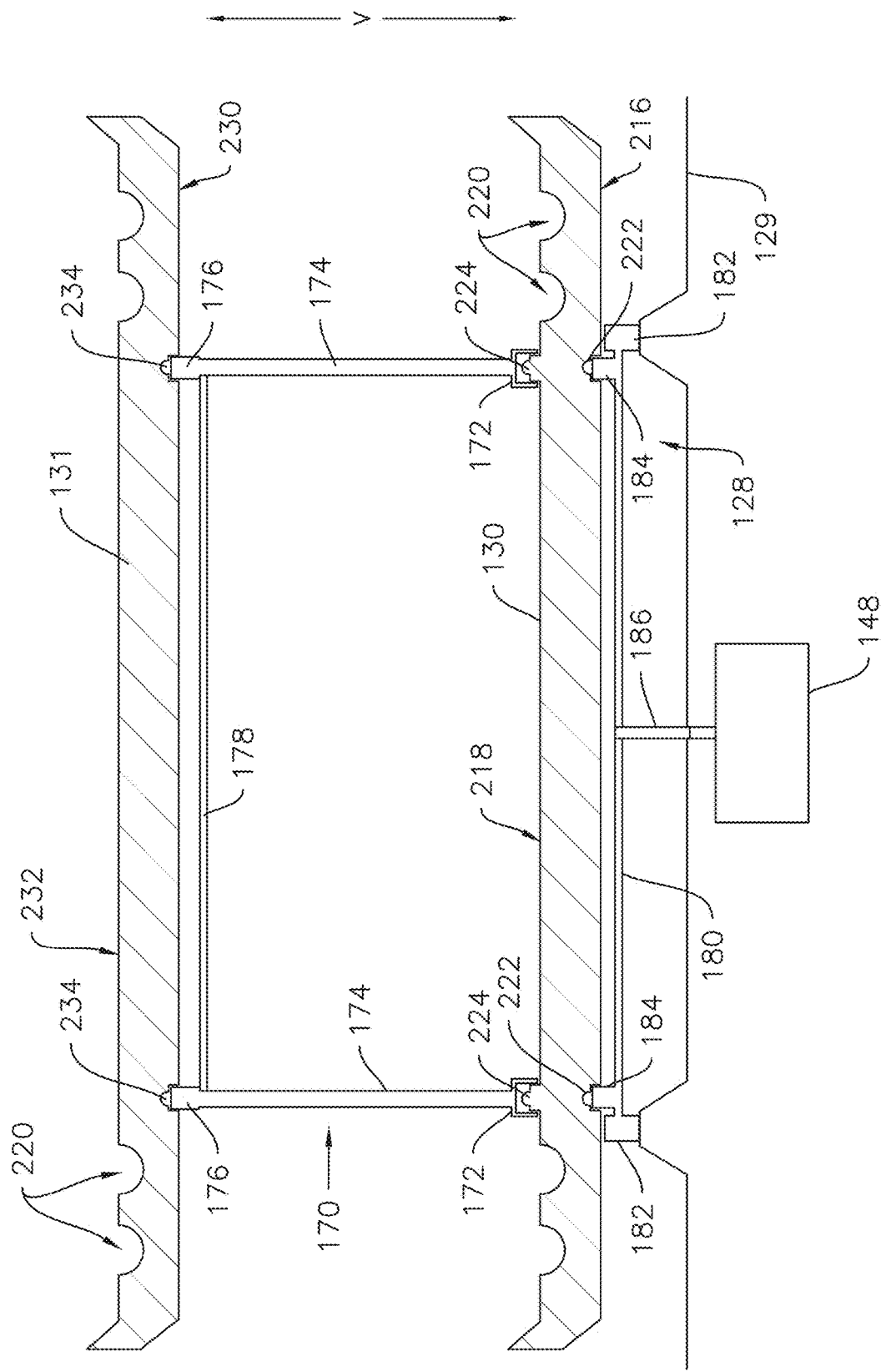
FIG. 17 provides a side schematic sectional view of exemplary components of a cooking appliance according to one or more example embodiments of the present subject matter.

As may be seen in FIGS. 4 through 6 and 17 through 19, in some embodiments the turntable 130 may be a part of a multi-pan tiered cooking utensil set including stackable pans. For example, as illustrated in FIGS. 4 through 6, the turntable 130 may be a first pan or lower pan and a second pan or upper pan 131 may also be provided in combination with the first pan (i.e., turntable) 130. In some embodiments, the upper pan 131 may be mounted directly on top of a rack 170 and the rack 170 may be mounted directly on the lower pan 130, e.g., as illustrated in FIG. 17. As mentioned above, the turntable 130 may be rotatably mounted in the cooking cavity 128. The upper pan 131 may be mounted to the turntable 130, e.g., above the turntable 130, and may be coupled to the turntable 130 such that the upper pan 131 rotates with the turntable 130 when a motor 148 (FIG. 17) of the cooking appliance 100 is activated. The motor 148 may be any suitable motor for providing rotational motivating force to the turntable 130 and the upper pan 131. In some exemplary embodiments, the motor 148 may be a stepper motor or any other suitable motor capable of the necessary motion control (velocity, direction, speed, and acceleration), as will be recognized by those of skill in the art. The structure and function of motors are generally understood by those of skill in the art and, as such, are not shown or described in further detail herein for the sake of brevity and clarity. In at least some example embodiments, the turntable 130 and the upper pan 131 may be indexed, e.g., with a poka-yoke connection, to ensure that the angular relationship of the turntable 130 and the upper pan 131 to each other and within the cooking cavity 128 is fixed. Also by way of example, in at least some embodiments, a position switch or sensor, such as a Hall effect sensor, may be provided in one or both of the turntable 130 and the housing 102 such that the angular position of the turntable 130 and upper pan 131 may be known, e.g., based on a signal from the position sensor received by the controller 150.

As an example poka-yoke connection, in some embodiments, the turntable 130 may be rotatably mounted within the cooking cavity 128 on a roller ring 180 (FIG. 17) and may be angularly positioned in a fixed alignment within the cooking cavity 128 as a result of such mounting connection. The roller ring may include a plurality of wheels 182, and each wheel 182 of the plurality of wheels 182 may be in contact with a bottom surface 129 of the cooking cavity 128 and spaced apart from, e.g., not in contact with, the turntable 130. For example, as illustrated in FIG. 17, the turntable 130 may extend between a bottom surface 216 and an opposing top surface 218. The bottom surface 216 of the turntable 130 may face the roller ring 180 and be spaced apart from the wheels 182 of the roller ring 180. The roller ring 180 may be coupled, such as directly coupled, to the motor 148. For example, as illustrated in FIG. 17, the motor 148 may include a drive shaft 186 and the roller ring 180 may be directly coupled to the drive shaft 186. The turntable 130 may be mounted on the roller ring by a poka-yoke connection, such as plurality of registration recesses 222 and a plurality of registration pins 184 corresponding to the plurality of registration recesses 222. For example, four registration recesses 222 may be provided, with two of the four registration recesses 222 defining a front position and having a distinct size and/or shape from that of the other two registration recesses 222, which define a rear position. In such embodiments, four registration pins 184 may be provided, e.g., two pairs of registration pins 184 having corresponding size and shape with that of the two pairs of registration recesses 222. In some embodiments, the registration recesses 222 may be formed in the turntable 130, such as in the bottom surface 216 thereof, and the registration pins 184 may be provided on the roller ring 180, e.g., as illustrated in FIG. 17. In other embodiments, the relative positions of the pins 184 and recesses 222 on the turntable 130 and the roller ring 180 may be reversed.

Figure 18:
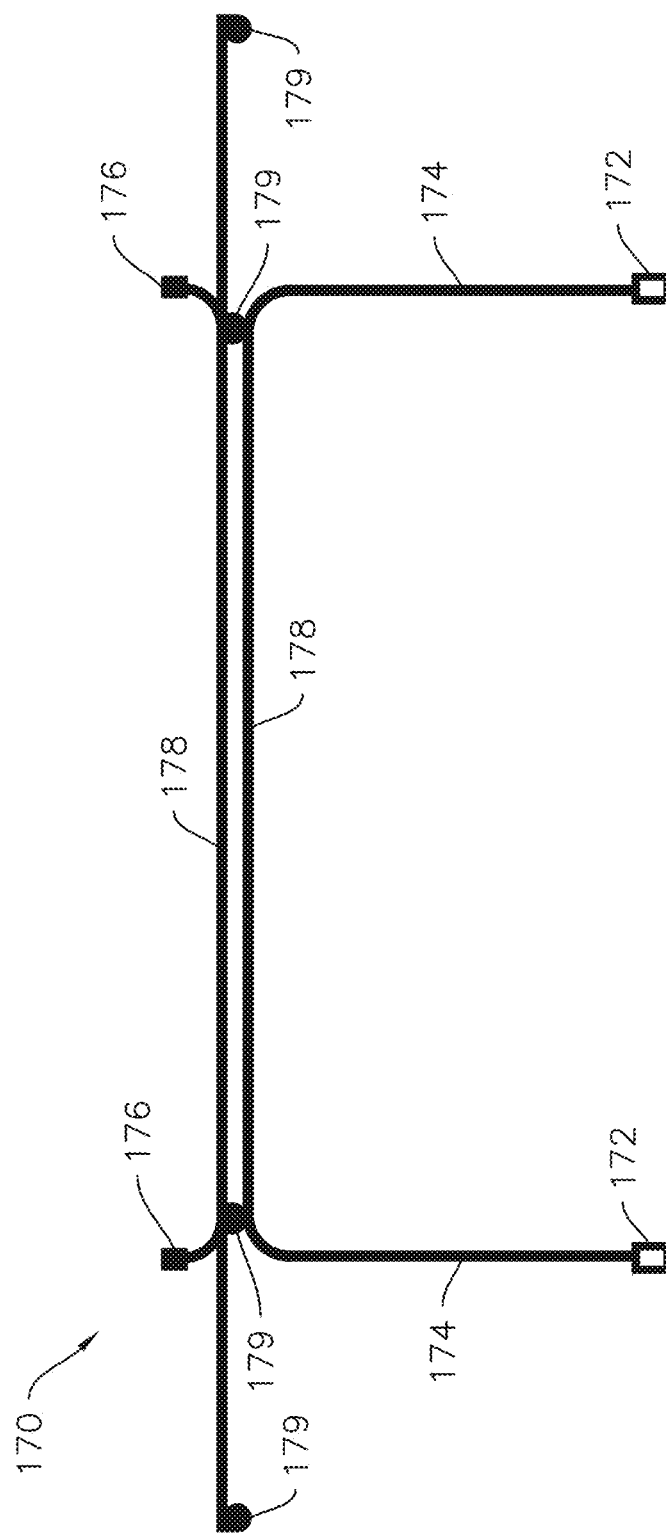
FIG. 18 provides a side schematic sectional view of an exemplary rack for a cooking appliance according to one or more example embodiments of the present subject matter.
Figure 19:
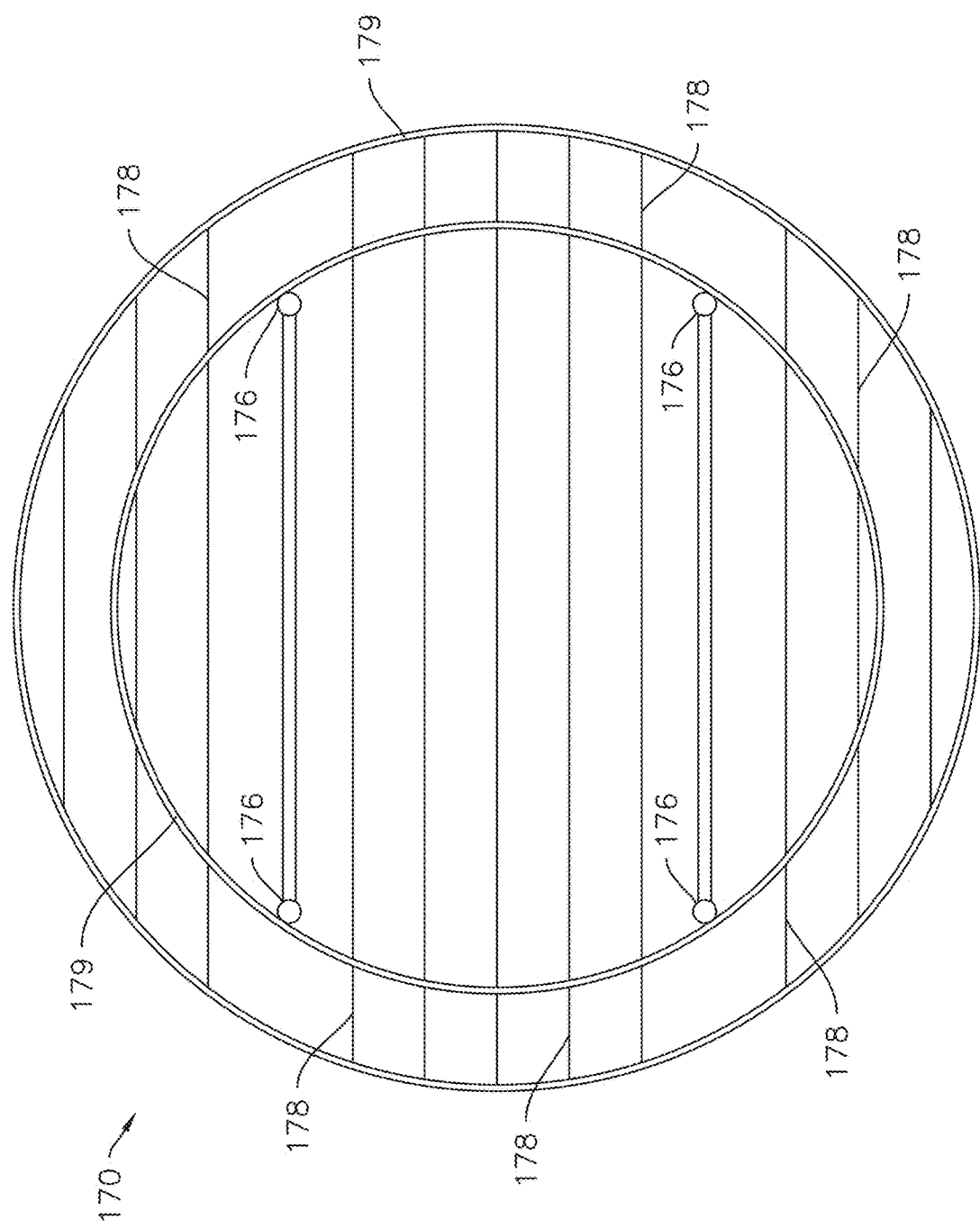
FIG. 19 provides a top-down overhead view of the exemplary rack of FIG. 18.

In some embodiments, the cooking appliance 100 may include a rack 170, e.g., as illustrated in FIGS. 17 through 19. The rack 160 may provide a pedestal or support for the upper pan 131, or may provide one or more distinct spatial locations for a plurality of food items directly on the rack 170, e.g., the rack 170 may be a cooking rack. Further, the rack 170 may also or instead be a meal cook fixture device. In some embodiments, the rack 170 may be mounted directly atop the turntable 130 and the upper pan 131 may be mounted directly atop the rack 170. For example, the rack 170 may be mounted directly on the turntable 130 by a plurality of feet 172 at a bottom end of the rack 170, such as at a bottom end of legs 174 of the rack 170. In such embodiments, the plurality of feet 172 may be engaged with a plurality of bosses 224 on the turntable 130, e.g., the bosses 224 may extend from the top surface 218 of the turntable 130. Additionally, each boss 224 of the plurality of bosses 224 on the turntable 130 may correspond to and be engaged with a respective one of the plurality of feet 172 of the rack 170, e.g., there may be a one-to-one correspondence between the bosses 224 on the turntable 130 and the feet 172 on the rack 170.

Also by way of example, the upper pan 131 may be mounted directly on the rack 170 by a plurality of heads 176 at a top end of the rack 170, such as at the top end of the legs 174 of the rack 170. The plurality of heads 176 may be engaged with a plurality of apertures 234 in the upper pan 131. Each head 176 of the plurality of heads 176 on the rack 170 may correspond to and be engaged with a respective one of the plurality of apertures 234 in the upper pan 131, e.g., there may be a one-to-one correspondence between the heads 176 on the rack 170 and the apertures 234 in the upper pan 131.

In some embodiments, the rack 170 may comprise a metallic material. The heads 176 and feet 172 of the rack 170 may comprise any suitable material which provides thermal insulation and electrical insulation, such as an elastomer material, e.g., a high-temperature silicone material. Such material may advantageously reduce or prevent microwave arcing and marring of the turntable 130 and/or upper pan 131. As illustrated in FIGS. 18 and 19, the rack 170 may also include a plurality of elongated members 178 extending generally perpendicular to the legs 174, e.g., generally along the lateral direction L when the rack 170 is mounted on the lower pan/turntable 130 and the turntable 130 is in a home position. The elongated members 178 of the rack 170 may also or instead extend generally horizontally, e.g., generally perpendicular to the vertical direction V and/or within a lateral-transverse plane defined by the lateral direction L and the transverse direction T.

In embodiments where the turntable 130 and the upper pan 131 are provided, a plurality of distinct spatial locations for food items within the cooking cavity 128 may thereby be defined. Examples of the plurality of distinct spatial locations are identified as 202, 204, and 206 in the accompanying figures, e.g. in FIGS. 4 and 5. The plurality of spatial locations may be distinct each from every other, e.g., the locations may be spaced apart or separated from one another, such that the locations are spatially distinct and correspond to different regions or areas within the cooking cavity 128. Further, as will be described in more detail below, the distinct spatial locations may each be closer to or in direct communication with a different heat or energy source. For example, the turntable 130 may be closer to the lower heater module 134 than the upper pan 131 and the turntable 130 may be in direct thermal communication with the lower heater module 134, whereby thermal energy, e.g., heat, from the lower heater module 134 travels to the turntable 130 and any food items which may be thereon before reaching the upper pan 131 and any food items on the upper pan 131. As another example, the upper pan 131 may be closer to the upper heater module 132 than the turntable 130 and the turntable 130 may be in direct thermal communication with the upper heater module 132. Similarly, the upper pan 131 may be closer to the microwave module 160, e.g., as in the example embodiment illustrated in FIG. 3, and the upper pan 131 may be in direct communication with the microwave module 160, whereby microwave energy from the microwave module 160 travels to the upper pan 131 and any food items which may be thereon before reaching the turntable 130 and any food items on the turntable 130. In addition to the vertically separated spatial locations in the foregoing examples, the plurality of distinct spatial locations may also be horizontally separated, e.g., separated within a lateral-transverse plane defined by the lateral direction L and the transverse direction T. As yet another example, a first spatial location 202 of the plurality of distinct spatial locations may be closer to the lamps 138 and 139 than a second spatial location 204 of the plurality of spatial locations when the turntable 130 and upper pan 131 are in a home position (the home position will described in more detail below), and the first and second locations 202 and 204 may be defined on or by the upper pan 131, such that the first and second locations 202 and 204 are each closer to the lamps 138 and 139 than a third spatial location 206 defined on or by the turntable 130. In some embodiments, one or both of the turntable 130 and the upper pan 131 may define more than one of the plurality of distinct spatial locations. For example, in the embodiments illustrated in FIGS. 4 through 6, the upper pan 131 includes a first distinct spatial location 202 and a second distinct spatial location 204 while a third distinct spatial location 206 is defined on the turntable 130. The illustrated first and second locations 202 and 204 each occupy or correspond to about one half of the upper pan 131, e.g., an arcuate extent of about 180°. In other examples, one or both of the distinct spatial locations may include different arcuate extents, such as two distinct spatial locations of less than 180° each with a separation between them, or one location greater than 180° with at least one other location less than 180° and a total size of all distinct spatial locations approximately equal to the usable area of the pan 130 or 131, or three or more distinct spatial locations in various combinations (such as three 120° locations, one 180° location with two 90° locations, three 100° locations with separations between each adjacent pair of locations, etc.), among other examples.

Figure 7:
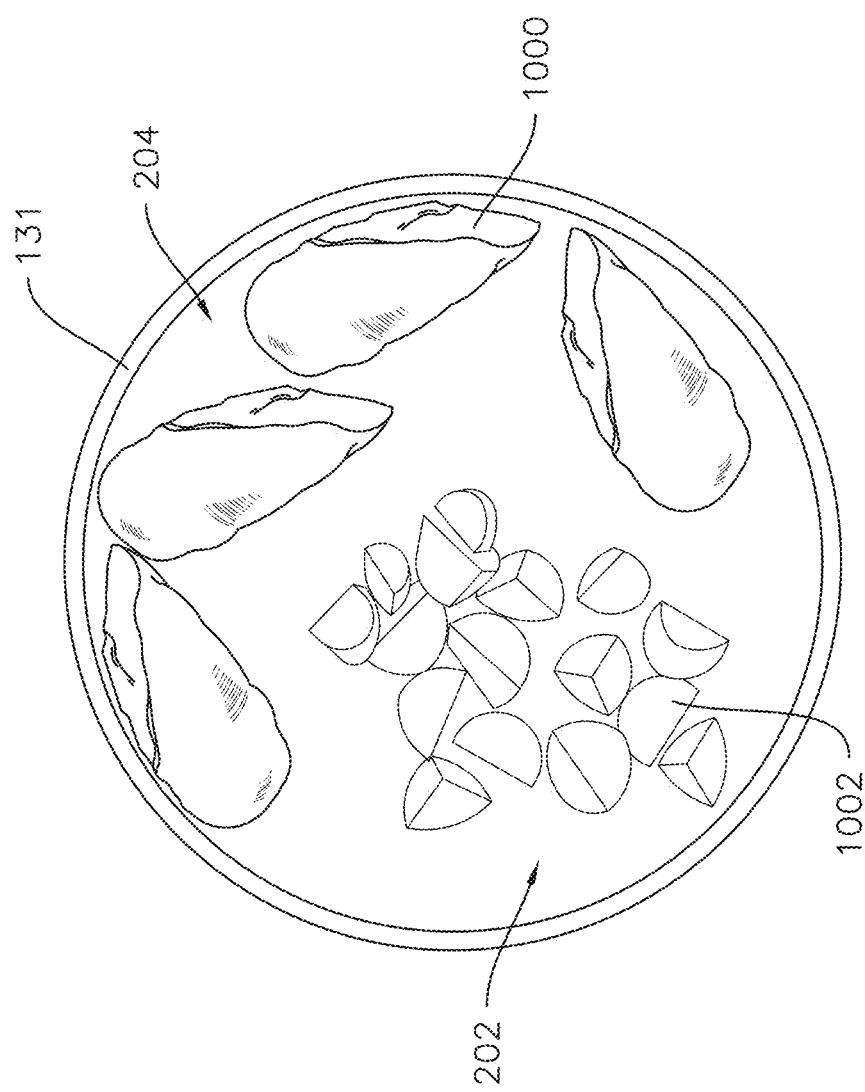
FIG. 7 provides a view of a plurality of food items arranged in multiple distinct spatial locations within the cooking appliance according to one or more additional example embodiments of the present subject matter.

Such distinct spatial locations 202, 204, and 206 may be useful in preparing an entire meal at once, e.g., in a meal cook cycle. Generally, an entire meal or complete meal includes multiple distinct food types, such as a meat, a vegetable, and/or a starch, in various combinations. Various examples of a complete meal are illustrated in FIGS. 6 through 8, each of which includes a plurality of food items positioned in a predetermined food arrangement. The predetermined food arrangement may, for example, be defined with respect to a home position of the pan(s) 130 and/or 131. In particular, the example meal in FIG. 6 includes a plurality of food items comprising meat 1000, potatoes 1002, and vegetables 1004. The plurality of food items in the exemplary meal of FIG. 6 are positioned in a predetermined arrangement where the potatoes 1002 are positioned in the first location 202 of the plurality of distinct spatial locations, the meat 1000 is positioned in the second location 204 of the plurality of distinct spatial locations, and the vegetables 1004 are positioned in the third location 206 of the plurality of distinct spatial locations. The meal illustrated in FIG. 6 is generally recognized as a meal for two, and is provided for illustrative purposes only, the cooking appliance 100 disclosed herein may also be used for cooking meals of other sizes as well, e.g., for one person, three people, or four people, or more, in various combinations.

FIG. 7 illustrates another example meal, e.g., a meal for four, which may be prepared using a meal cook cycle according to one or more additional example embodiments of the present disclosure. In FIG. 7, the plurality of food items includes meat 1000 and potatoes 1002 which are positioned in a predetermined food arrangement such that the potatoes 1002 are positioned in the first location 202 of the plurality of distinct spatial locations and the meat 1000 is positioned in the second location 204 of the plurality of distinct spatial locations. In contrast to the example of FIG. 6, the first and second locations 202 and 204 are of unequal size and shape in FIG. 7. In some embodiments, for example as illustrated in FIG. 7, the first location 202 may be campanulate, e.g., shaped like a bell, such that the first location 202 may occupy a generally trapezoidal area within one of the pans 130 or 131, and the second location 204 may be arcuate or C-shaped, e.g., may extend partially around a circumference of one of the pans 130 or 131, e.g., generally parallel to the circumference of the pan 130 or 131.

FIG. 8 illustrates another example meal, e.g., which is generally recognized as a breakfast meal, which may be prepared using a meal cook cycle according to one or more additional example embodiments of the present disclosure. The plurality of food items which makes up the example meal illustrated in FIG. 8 includes biscuits 1006 in the first location 202, eggs 1008 in the second location 204, and bacon 1010 in the third location 206. In some embodiments, the first location 202 may be cruciform, such as a symmetrical cruciform, such that the first location 202 may occupy a generally X-shaped area (or plus sign shaped, depending on the angle of rotation) within one of the pans 130 or 131, and the second location 204 may correspond to a series of locations spaced apart along the circumference of the pan 130 or 131 and arranged or positioned between the arms of the cruciform first location 202. Additionally, the third location 206 may, in some embodiments, correspond to or occupy substantially all of one of the pans 130 or 131, such as the bottom pan (turntable) 130 as in the example embodiment illustrated in FIG. 8.

As mentioned, the plurality of food items includes food items of different food types. Such distinct food types also have distinct optimal cooking conditions. For example, meats 1000 may require higher temperatures and relatively short cooking times as compared to potatoes 1002, whereas vegetables 1004 may require lower heat than the meats 1000 and less time than the potatoes 1002.

Each of the distinct spatial locations 202, 204, and 206 may lie within a different region or area within the cooking cavity 128. Thus, each location 202, 204, and 206 may be proximate one heating module and distant from another heating module. For example, referring the configuration of cooking appliance 100 illustrated in FIG. 3, where the microwave module 160 and the cooking lamps 138 and 139 are positioned above the cooking cavity 128, positioning the upper pan 131 above the turntable 130 means that first and second locations 202 and 204 will receive a larger proportion of the energy from the microwave module 160 and the cooking lamps 138 and 139 than will the third location 206 defined on the turntable 130. Additionally, the third location 206 on the turntable 130 will receive a larger proportion of the energy from the lower heater module 134 than will the first and second locations 202 and 204 on the upper pan 131. Further, depending on the angular position of the turntable 130 and the upper pan 131, one of the first location 202 and the second location 204 may be closer to the microwave module 160 while the other of the first location 202 and the second location 204 may be closer to the cooking lamps 138 and 139. When the angular position of the turntable 130 and the upper pan 131 changes during the meal cook cycle, e.g., while the turntable 130 and the upper pan 131 are rotating, the microwave module 160 and the cooking lamps 138 and 139 may be selectively activated/deactivated and/or adjusted corresponding to the rotation of the turntable 130 and the upper pan 131.

Thus, in various embodiments, a plurality of food items which collectively make up a meal may be positioned in a predetermined food arrangement on the pan(s) 130 and/or 131 such that a first food item of the plurality of food items is positioned in a first distinct spatial location of the plurality of distinct spatial locations proximate one of the modules and a second food item of the plurality of food items is positioned in a second distinct spatial location of the plurality of distinct spatial locations proximate another of the modules, etc.

In order to simultaneously cook the distinct food types in a single cycle of a single appliance, the cooking appliance 100 may be configured to provide differing amounts of energy to the different locations, e.g., differing amounts of energy may be provided to each of the first location 202, the second location 204, and the third location 206 during the meal cook cycle. The differing amounts of energy may include microwave energy from the microwave module 160 and/or thermal energy from one or more of the upper heater module 132, the lower heater module 134, and the convection module 140. Thus, embodiments of the present disclosure include a cooking appliance 100 configured to perform the meal cook cycle as well as methods of operating a cooking appliance, such as the cooking appliance 100, in a meal cook cycle. In various embodiments, the motion of the turntable 130 and upper pan 131 and the sequencing of the heating modules (e.g., including some or all of the microwave module 160, the convection module 140, the upper heating module 132 and the lower heating module 134, in various combinations) allows different amounts of energy, e.g., thermal and/or microwave energy, to be applied to each location 202, 204, and 206 during the meal cook cycle.

For example, in at least some embodiments, the meal cook cycle may include rotating the turntable 130 and the upper pan 131 within the cooking cavity 128 while selectively activating and/or adjusting at least one of the microwave module 160, the upper heater module 132, the lower heater module 134, and the convection module 140. In various embodiments, rotation of the turntable 130 and upper pan 131 may include one or more of: rotating at varying rotational speeds, moving the turntable 130 and the upper pan 131 to an exact angular position, dwelling, and oscillating back and forth. The foregoing various embodiments and combinations thereof with respect to the rotation of the turntable 130 and the upper pan 131 may be provided separately or in combination with several various embodiments of activating and/or adjusting one or more (up to and including all) of the heating modules.

For example, the convection module 140 may be deactivated during a portion of the meal cook cycle, may be activated at a first heat setting (e.g., about 350° F.) during another portion of the meal cook cycle, and may be activated at a second heat setting different from the first heat setting (e.g., about 300° F. or about 450° F., etc.) during yet another portion of the meal cook cycle. In some embodiments, only the fan 144 of the convection module 140 may be activated without activating the heating element 142 during all or part of the meal cook cycle. In some embodiments, the lower heater module 134 may be activated and deactivated (e.g., turned on and off) and/or adjusted (e.g., within a range greater than zero) during the meal cook cycle. In some embodiments where the upper heater element 132 includes first and second cooking lamps 138 and 139, the meal cook cycle may include activating the first cooking lamp 138 while the second cooking lamp 139 is deactivated during a first portion of the meal cook cycle and activating both the first cooking lamp 138 and the second cooking lamp 139 during a second portion of the meal cook cycle. Embodiments of the meal cook cycle may include any or all of the foregoing examples in various combinations, e.g., in some embodiments the cooking lamps 138 and 139 may be alternatingly activated while the temperature output level of the convection module 140 is also adjusted during the meal cook cycle.

In some embodiments, the meal cook cycle may include activating the microwave module 160 at varying power levels during the meal cook cycle to provide differing amounts of energy to each of the first location 202, the second location 204, and the third location 206 throughout the meal cook cycle.

Figure 9:
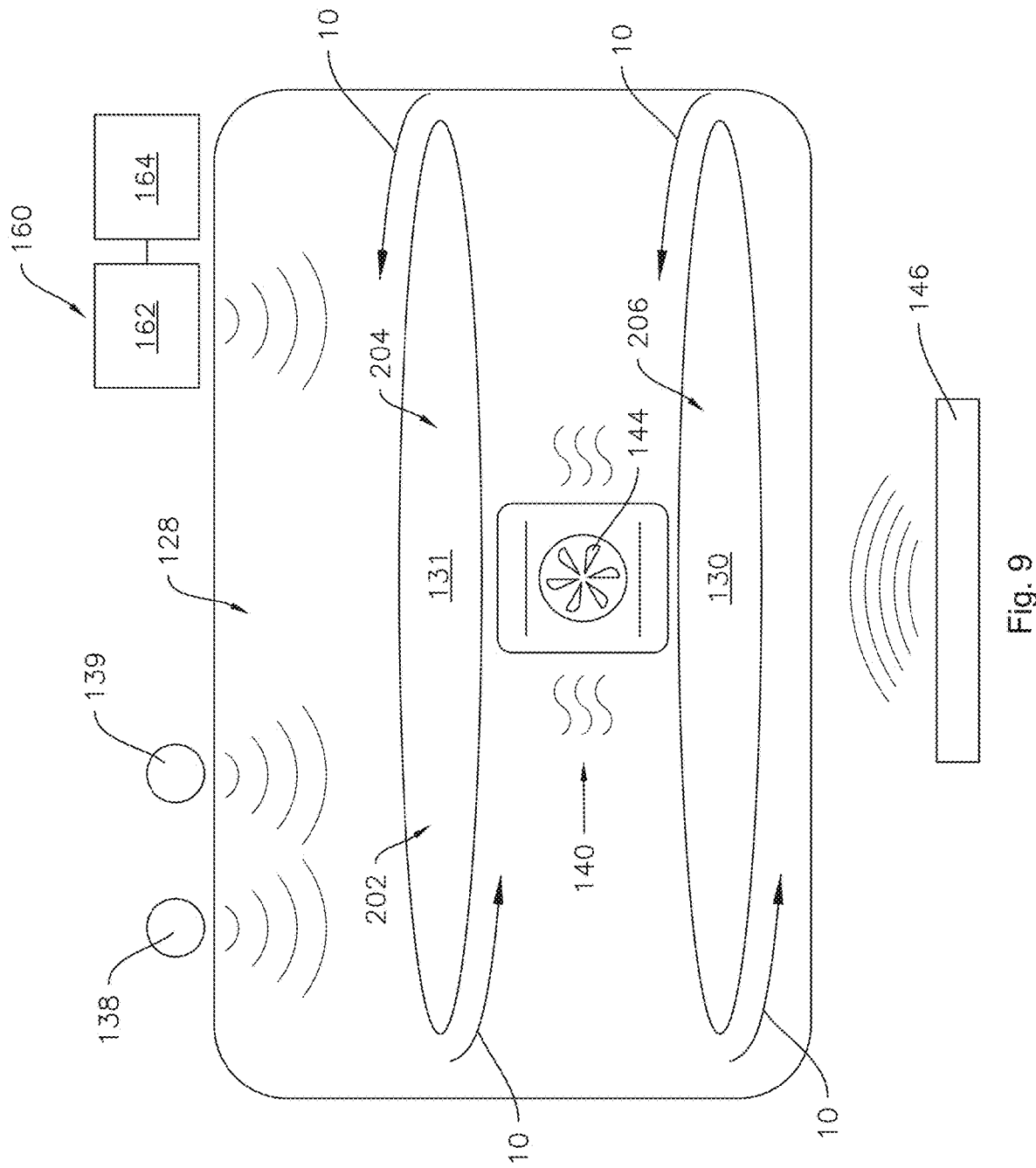
FIG. 9 provides a schematic perspective view of a cooking appliance according to one or more additional example embodiments of the present subject matter.

In some embodiments, e.g., as illustrated in FIG. 9, the microwave module 160 may include a magnetron 162 and a power supply 164. The power supply 164 may comprise a transformer power supply in some embodiments. In alternative embodiments, the power supply 164 may comprise an inverter power supply. In embodiments where the power supply 164 is a transformer power supply, activating the microwave module 160 at varying power levels during the meal cook cycle may be achieved by varying a duty cycle of the magnetron 162, e.g., by turning the magnetron 162 on and off at varying points throughout the meal cook cycle. The duty cycle may be defined by, e.g., the time it takes for the turntable 130 and the upper pan 131 to make a complete rotation (e.g., to rotate through an angle of 360°). For example, a ten percent (10%) duty cycle may comprise turning the magnetron 162 on through 10% of each revolution of the turntable 130 and the upper pan 131, e.g., through about 36° of rotation of the turntable 130 and the upper pan 131. The sequence of activating and deactivating the magnetron 162 may be staggered such that different segments of the turntable 130 and the upper pan 131 are most proximate (relative to the remainder of the turntable 130 and the upper pan 131) to the microwave module 160 each time the magnetron 162 is turned on, e.g., in embodiments such as those illustrated in FIGS. 2 and 3, where the microwave module 160 is not centered with the cooking cavity 128.

As mentioned above, in alternative embodiments, the power supply 164 may comprise an inverter power supply. In embodiments where the power supply 164 is an inverter power supply, activating the microwave module 160 at varying power levels during the meal cook cycle may be achieved by varying an output power level of the magnetron 160 using the inverter power supply 164. In at least some embodiments, the output power level of the magnetron 162 may be varied using the inverter power supply 164 within a range of between about ten percent (10%) power and about ninety-five percent (95%) power. As mentioned above, terms of approximation used herein include a ten percent margin of error, e.g., in the context of the foregoing output power levels, a ten percentage point margin of error, such that about 10% power includes values greater than zero (and does not include zero power) up to twenty percent (20%), while about 95% includes values from eighty-five percent (85%) up to one hundred percent (100%).

In other embodiments, the microwave module 160 may include a solid state radio frequency (RF) microwave unit. Such embodiments of the microwave module 160 may be particularly useful when configured as in the example illustrated by FIG. 10, where multiple microwave modules 160 are provided at discrete locations within the cooking appliance 100. With this configuration, the output of each solid state RF microwave unit 160 may be varied throughout the meal cook cycle to selectively target each location 202, 204, and 206 of the plurality of distinct spatial locations with the optimal or preferred amount of microwave energy, including varying the output power of each microwave unit or module 160 correspondingly (e.g., synchronized) with the rotation of the turntable 130 and the upper pan 131. For example, in various embodiments where the microwave module 160 comprises the solid state RF microwave unit 160, activating the microwave module 160 at varying power levels during the meal cook cycle may be accomplished by varying an output power level of the solid state radio frequency microwave unit between a first output power level greater than zero and a second output power level greater than the first output power level during the meal cook cycle.

In some embodiments, the meal cook cycle may include rotating the turntable 130 and the upper pan 131 at a constant rotational speed during the meal cook cycle. In other embodiments, the meal cook cycle may include rotating the turntable 130 and the upper pan 131 at a first speed during a first portion of the meal cook cycle and rotating the turntable 130 and the upper pan 131 at a second speed different from the first speed during a second portion of the meal cook cycle. For example, meat 1000 may be placed in the second location 204 and potatoes 1002 may be placed in the first location 202, e.g., as illustrated in FIG. 6. In this example, it may be preferable to expose the potatoes 1002 to a relatively higher level of microwave energy to promote rapid cooking thereof, while it may also be preferable to minimize exposure of the meat 1000 to microwave energy to preserve or optimize texture and/or flavor of the meat 1000. Thus, for example, the speed of rotation of the upper pan 131 may be increased when the second location 204 is proximate the microwave module 160 and decreased when the first location 202 is proximate the microwave module 160, thereby providing more exposure to microwave energy for the potatoes 1002 in the first location 202 and less exposure for the meat 1000 in the second location 204. As another example, it may be preferable to maximize exposure of the meat 1000 to the cooking lamps 138 and 139, for example to brown the meat 1000. Thus, in some embodiments, the speed of rotation of the upper pan 131 may be increased when the first location 202 is proximate the cooking lamps 138 and 139 of the upper heating module 132 and decreased when the second location 204 is proximate the cooking lamps 138 and 139, thereby providing more exposure to energy from the cooking lamps 138 and 139 for the meat 1000 in the second location 204 and less exposure for the potatoes 1002 in the first location 202.

Figure 10:
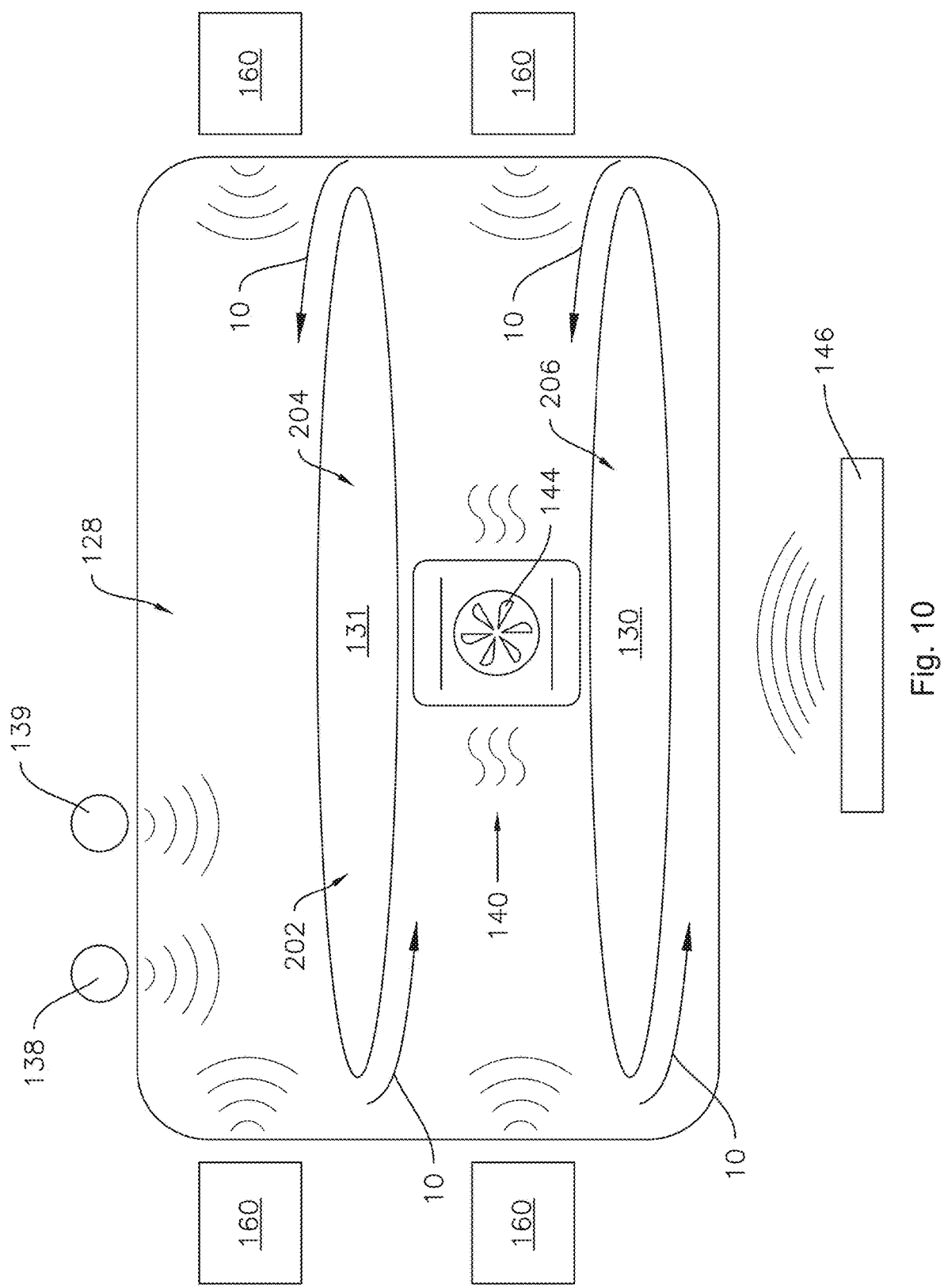
FIG. 10 provides a schematic perspective view of a cooking appliance according to one or more additional example embodiments of the present subject matter.
Figure 11:
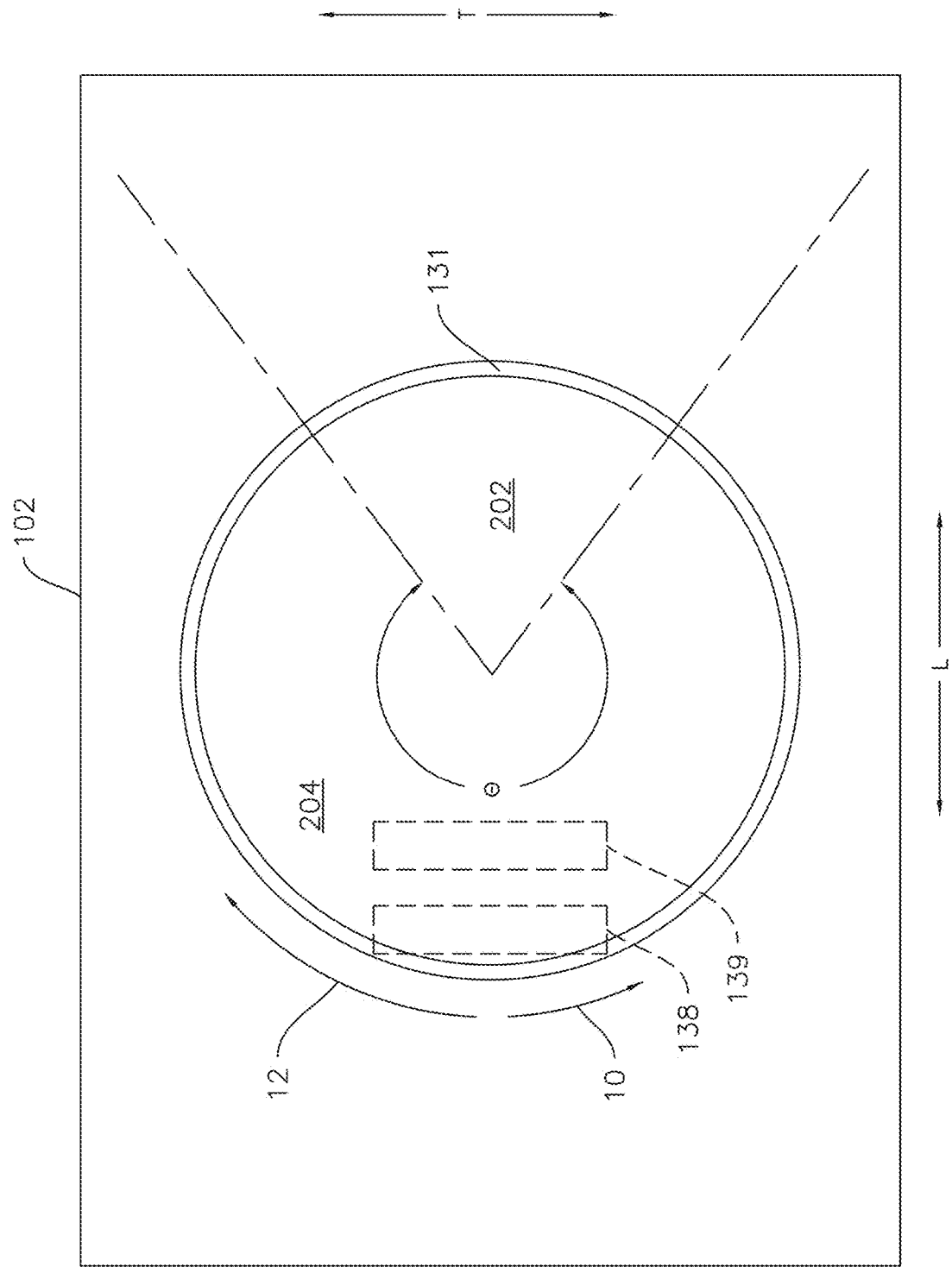
FIG. 11 provides a schematic top down view of components of a cooking appliance according to one or more additional example embodiments of the present subject matter.

In some embodiments, the meal cook cycle may include rotating the turntable 130 and the upper pan 131 in a first direction 10, e.g., as indicated by arrows 10 in FIGS. 9 and 10, such as only rotating the turntable 130 and the upper pan 131 in the first direction 10. In other embodiments, the meal cook cycle may also include alternately rotating the turntable 130 and the upper pan 131 in the first direction 10 and a second direction 12, e.g., as indicated by arrows 10 and 12 in FIG. 11, where the first and second direction 10 and 12 are coplanar (e.g., defined within the same plane) and are opposite. For example, the first direction 10 may be counterclockwise as illustrated in FIG. 11 and the second direction 12 may be clockwise also as illustrated in FIG. 11. Some such embodiments may include full rotation of the turntable 130 and the upper pan 131, e.g., rotating the turntable 130 and the upper pan 131 at least 360° in the first direction 10 before rotating the turntable 130 and the upper pan 131 in the second direction 12, also through at least 360° of rotation. Other embodiments including both the first direction 10 and the second direction 12 may include rotating the turntable 130 and the upper pan 131 less than 360° in each direction 10 and 12. For example, as shown in FIG. 11, the turntable 130 and the upper pan 131 may be rotated through an angle Θ, where Θ is less than 360°. The turntable 130 and the upper pan 131 may be rotated the same amount in each direction 10 and 12 or different amounts in each direction. For example, the turntable 130 and the upper pan 131 may be rotated through an arc encompassing about 180° in the first direction 10 and through an arc encompassing about 270° in the second direction 12. Additional embodiments including both the first direction 10 and the second direction 12 may include rotating the turntable 130 and the upper pan 131 the same amount in each direction, e.g., rotating through the same angular distance in each direction. Such embodiments may include oscillating the turntable 130 and the upper pan 131. In various embodiments, the meal cook cycle may include rotating the turntable 130 and the upper pan 131 back and forth within an arc encompassing an angle Θ of about 270° or less, such as about 180°, such as about 90°, such as about 45° or less. Referring again to the example meal illustrated in FIG. 6, meat 1000 in the second location 204 may preferably receive a higher level of energy from the cooking lamps 138 and 139 than the potatoes 1002. Thus, as illustrated in FIG. 11, the angle Θ may be selected such that throughout the range of motion of the turntable 130 and the upper pan 131, a greater proportion of the area immediately proximate the cooking lamps 138 and 139 is occupied by the second location 204 than the first location 202. Note that FIG. 11 is a view looking down from within the housing 102 at the upper pan 131 such that the projected locations of the cooking lamps 138 and 139 relative to the upper pan 131 are shown in dashed lines in FIG. 11 (e.g., the cooking lamps 138 and 139 are positioned above the view plane in FIG. 11). Additionally, it should be noted that the angle Θ may define at least one location of the plurality of distinct spatial locations, e.g., as illustrated in FIG. 11, the second location 204 corresponds to a portion of the pan 131 that subtends the angle Θ and the first location 202 corresponds to a portion of the pan 131 which subtends an angle that, in combination with the angle Θ, completes the circumference of the pan 131.

The operation of the cooking lamps 138 and 139 may be varied throughout the meal cook cycle to selectively target each location 202, 204, and 206 with the optimal or preferred amount of cooking energy, including activating and/or deactivating each lamp 138 and 139 correspondingly (e.g., synchronized) with the rotation of the turntable 130 and the upper pan 131. In particular embodiments where the cooking lamps 138 and 139 are positioned above the cooking cavity 128, the cycling of the cooking lamps 138 and 139 may be synchronized with the rotation of the upper pan 131 which is closer to the top of the cooking cavity 128 than the turntable 130 to selectively direct energy from the cooking lamps 138 and 129 to the locations defined on the upper pan 131, e.g., the first and second locations 202 and 204.

Figure 12:
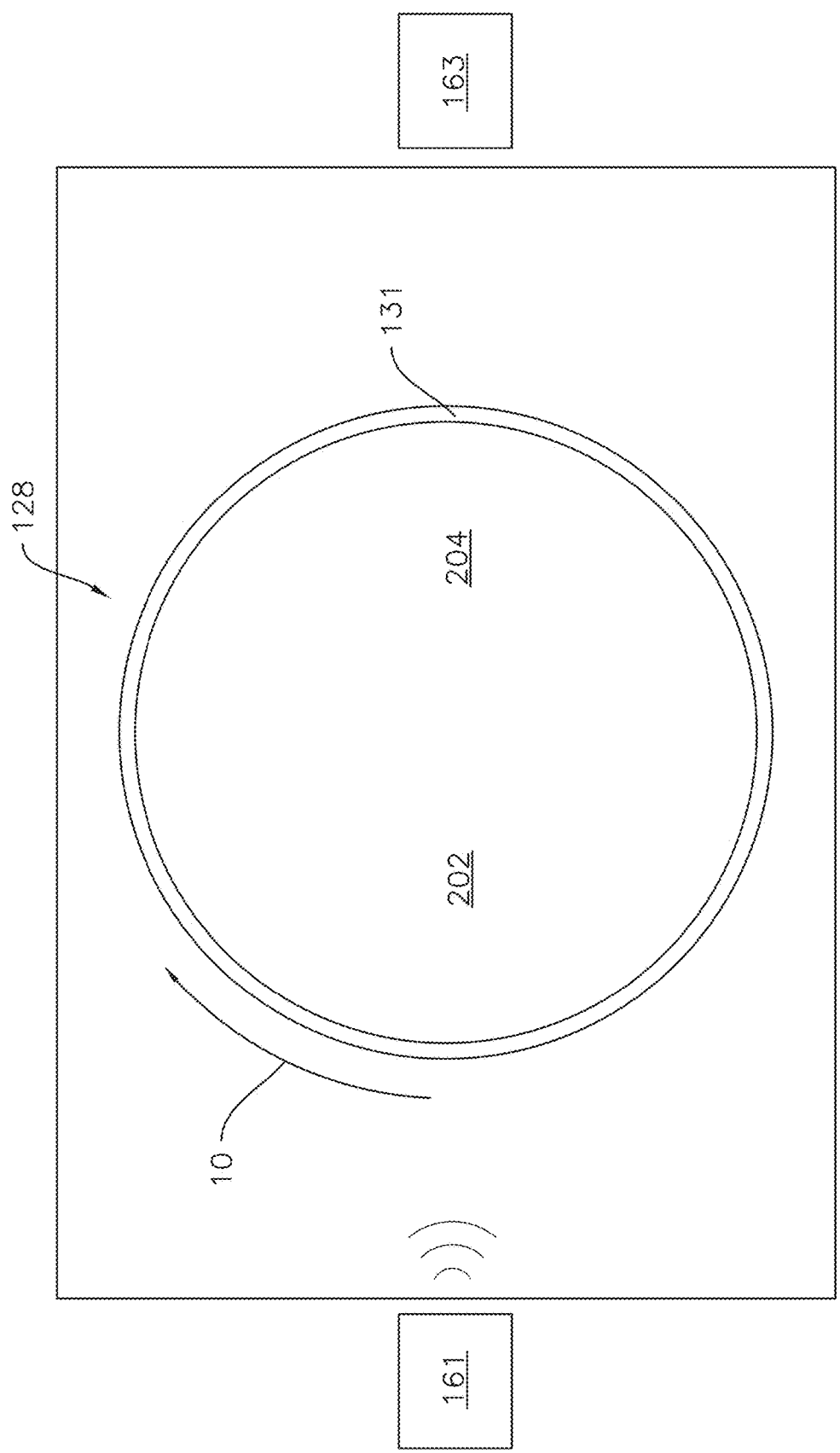
FIG. 12 provides a schematic illustration of an exemplary cooking appliance in a first angular position according to one or more additional example embodiments of the present subject matter.
Figure 13:
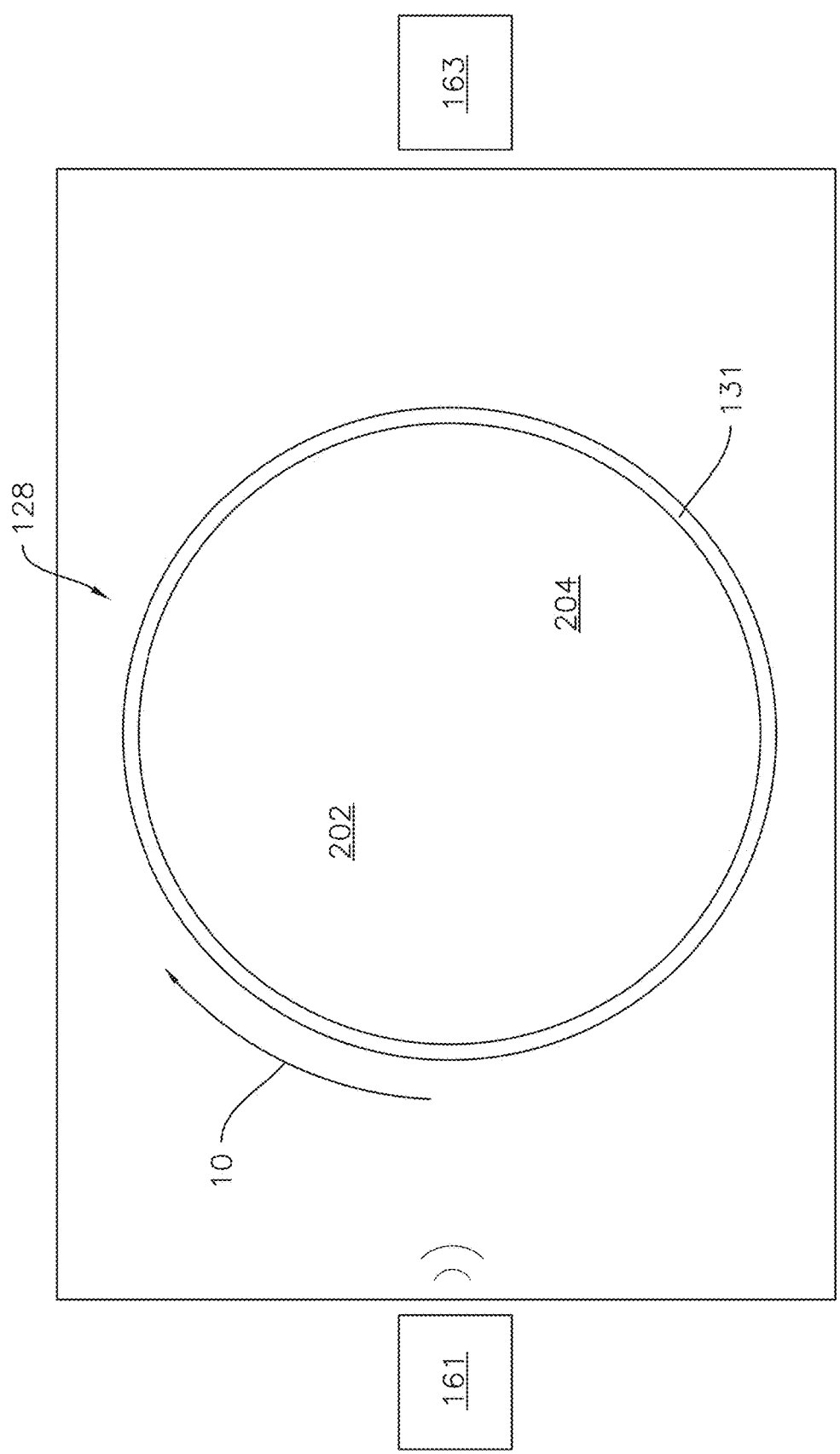
FIG. 13 provides a schematic illustration of the exemplary cooking appliance of FIG. 12 in a second angular position.
Figure 14:
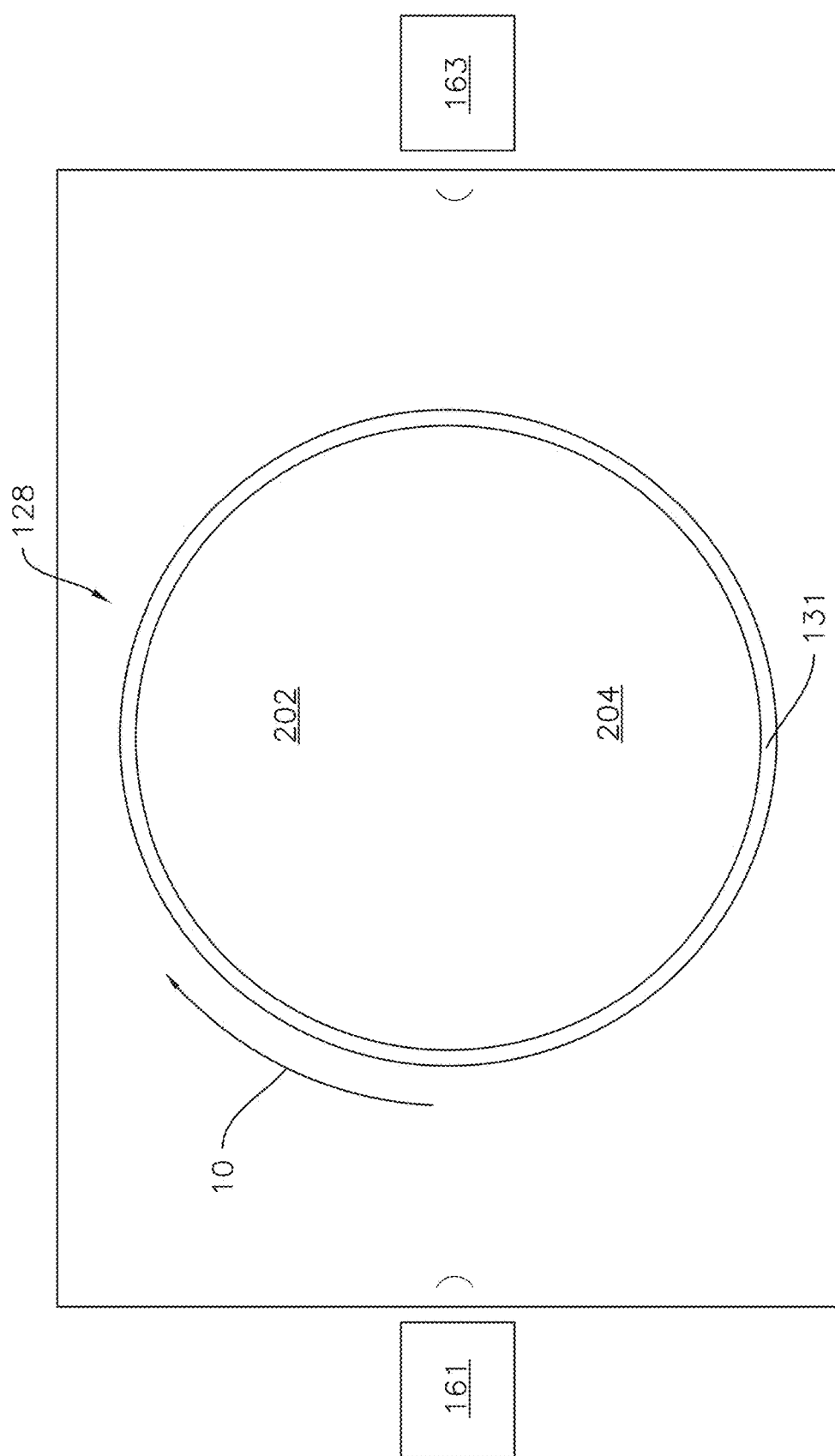
FIG. 14 provides a schematic illustration of the exemplary cooking appliance of FIG. 12 in a third angular position.
Figure 15:
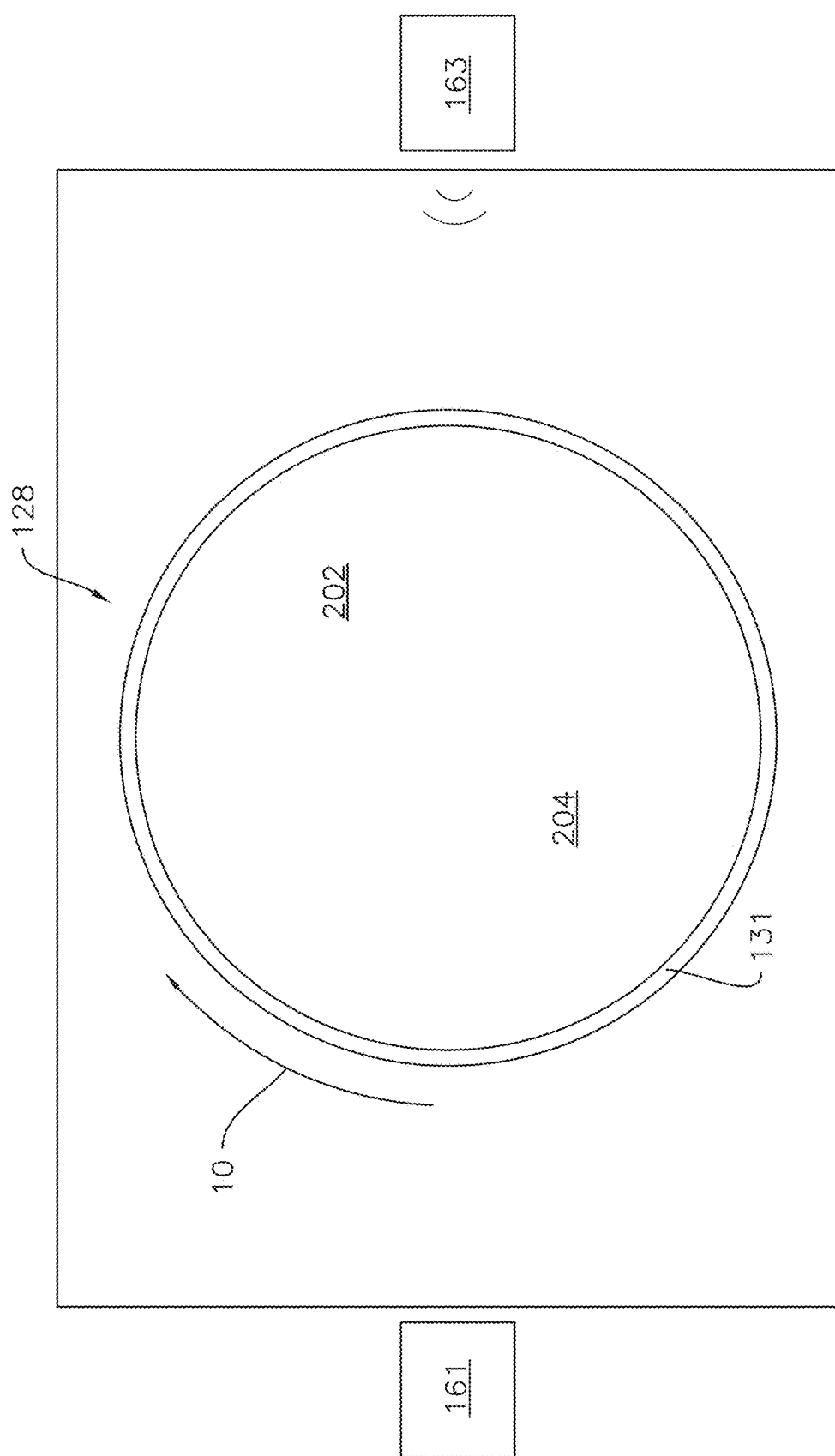
FIG. 15 provides a schematic illustration of the exemplary cooking appliance of FIG. 12 in a fourth angular position.
Figure 16:
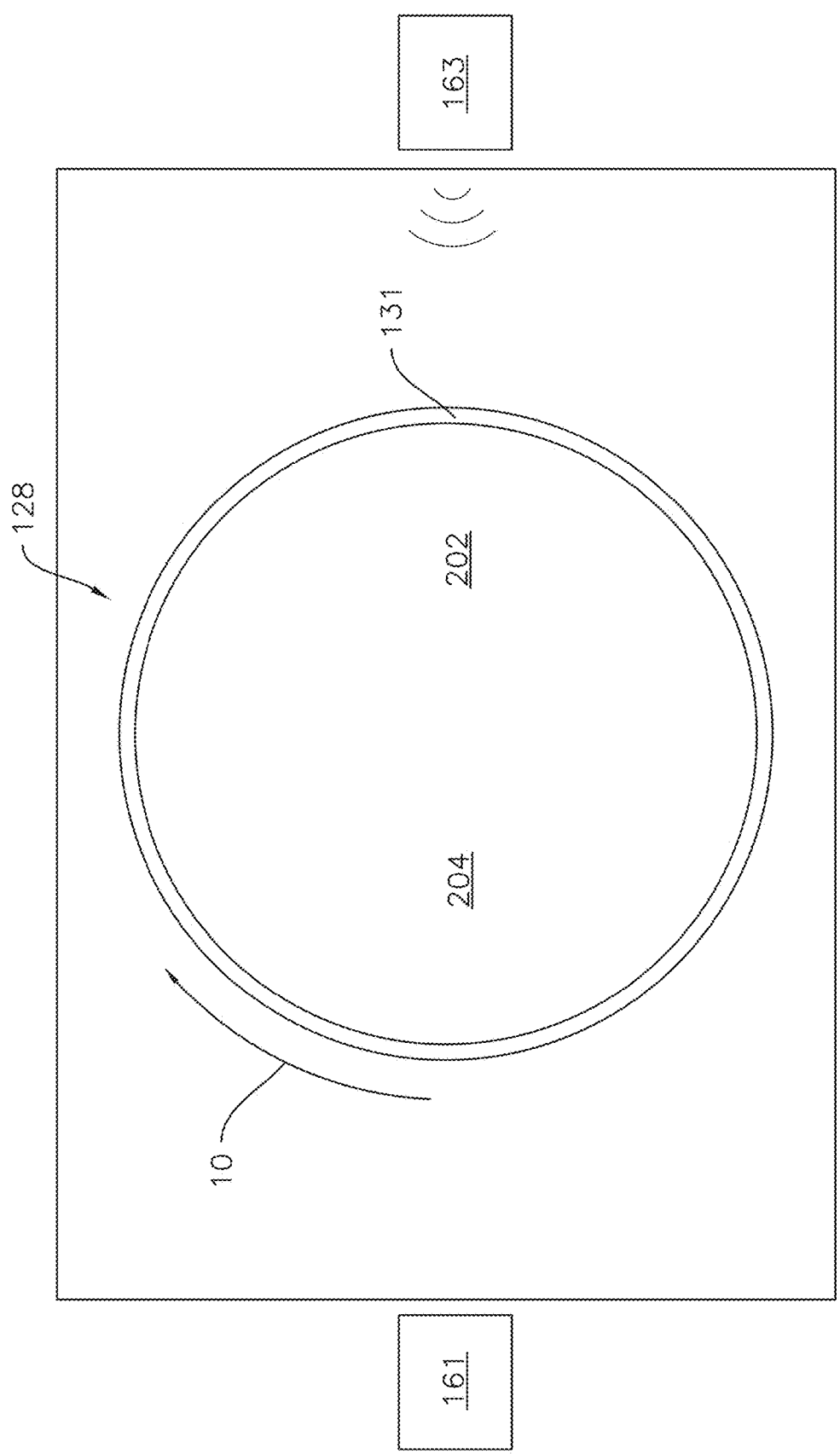
FIG. 16 provides a schematic illustration of the exemplary cooking appliance of FIG. 12 in a fifth angular position.

As mentioned above, one or more heating modules of the cooking appliance 100 may be adjusted during the meal cook cycle, and such adjustments may be synchronized with the rotation of the turntable 130 and the upper pan 131. One example of such operation is illustrated in FIGS. 12 through 16. As shown, e.g., in FIG. 10, the cooking appliance 100 may include multiple microwave modules 160. In the example illustrated by FIGS. 12 through 16, the multiple microwave modules 160 may include a first microwave module 161 on a first side of the cooking appliance 100 and a second microwave module 163 on a second side of the cooking appliance 100 opposite the first side. In some exemplary meal cook cycles, it may be desirable to provide more microwave energy to the first location 202 than to the second location 204. Thus, as shown in FIG. 12, when, in a first angular position, the first location 202 is directly proximate the first microwave module 161 the first microwave module 161 may be activated at a first power level, e.g., full power, while the second microwave module 163 may be deactivated. The first location 202 may be directly proximate the first microwave module 161 when the center of the first location 202 and the microwave module 161 are aligned, e.g., along a line also passing through a geometric center of the upper pan 131 and/or of the cooking cavity 128. As shown in FIG. 13, when the turntable 130 and the upper pan 131 have rotated along the first direction 10 to a second angular position where the first location 202 is not aligned with or centered proximate the first microwave module 161, e.g., the center point of the first location 202 no longer falls on the line between the first microwave module 161 and the geometric center of the upper pan 131/cooking cavity 128. Operation of the microwave modules 161 and 163 may be synchronized with the rotation of the turntable 130 and the upper pan 131 such that the first microwave module 161 may be activated at a second power level, e.g., less than the first power level, when the turntable 130 and the upper pan 131 are in the second angular position, while the second microwave module 163 may remain deactivated. FIG. 14 illustrates the cooking appliance 100 in a third angular position, e.g., the turntable 130 and the upper pan 131 in the third angular position. In the third angular position, the first location 202 and the second location 204 are both equally spaced relative to each of the first microwave module 161 and the second microwave module 163. As such, the first microwave module 161 and the second microwave module 163 may be operated at the same power level as each other when the turntable 130 and the upper pan 131 are in the third angular position. For example, as illustrated in FIG. 14, the first microwave module 161 and the second microwave module 163 may be operated at a third power level which is greater than zero and less than the second power level when the turntable 130 and the upper pan 131 are in the third angular position. In FIG. 15, the turntable 130 and the upper pan 131 have continued to rotate along the first direction 10 to a fourth angular position. In the fourth angular position, the first location 202, such as a center point thereof, is closer to the second microwave module 163 than to the first microwave module 161, but is not yet centered and aligned with the second microwave module 163. Thus, the second microwave module 163 may be operated at the second power level when the turntable 130 and the upper pan 131 are in the fourth angular position. Also as may be seen in FIG. 15, the second location 204 is closer to the first microwave module 161 than to the second microwave module 163 in the fourth angular position, such that the first microwave module 161 may be deactivated when the turntable 130 and the upper pan 131 are in the fourth angular position. A fifth angular position of the turntable 130 and the upper pan 131 is illustrated in FIG. 16 which is 180° away from the first angular position of FIG. 12. In the fifth angular position of FIG. 16, the first location 202 is now centered and aligned with the second microwave module 163, e.g., the center of the first location 202 and the second microwave module 163 may be aligned with each other along a line also passing through the center of the upper pan 131 and/or cooking cavity 128, while the second location 204 is centered and aligned with the first microwave module 161. Accordingly, when the turntable 130 and the upper pan 131 are in the fifth angular position, the second microwave module 163 may be operated at the first power level greater than the second power level while the first microwave module 161 may be deactivated to reduce or minimize the exposure of the second location 204 to microwave energy.

Figure 20:
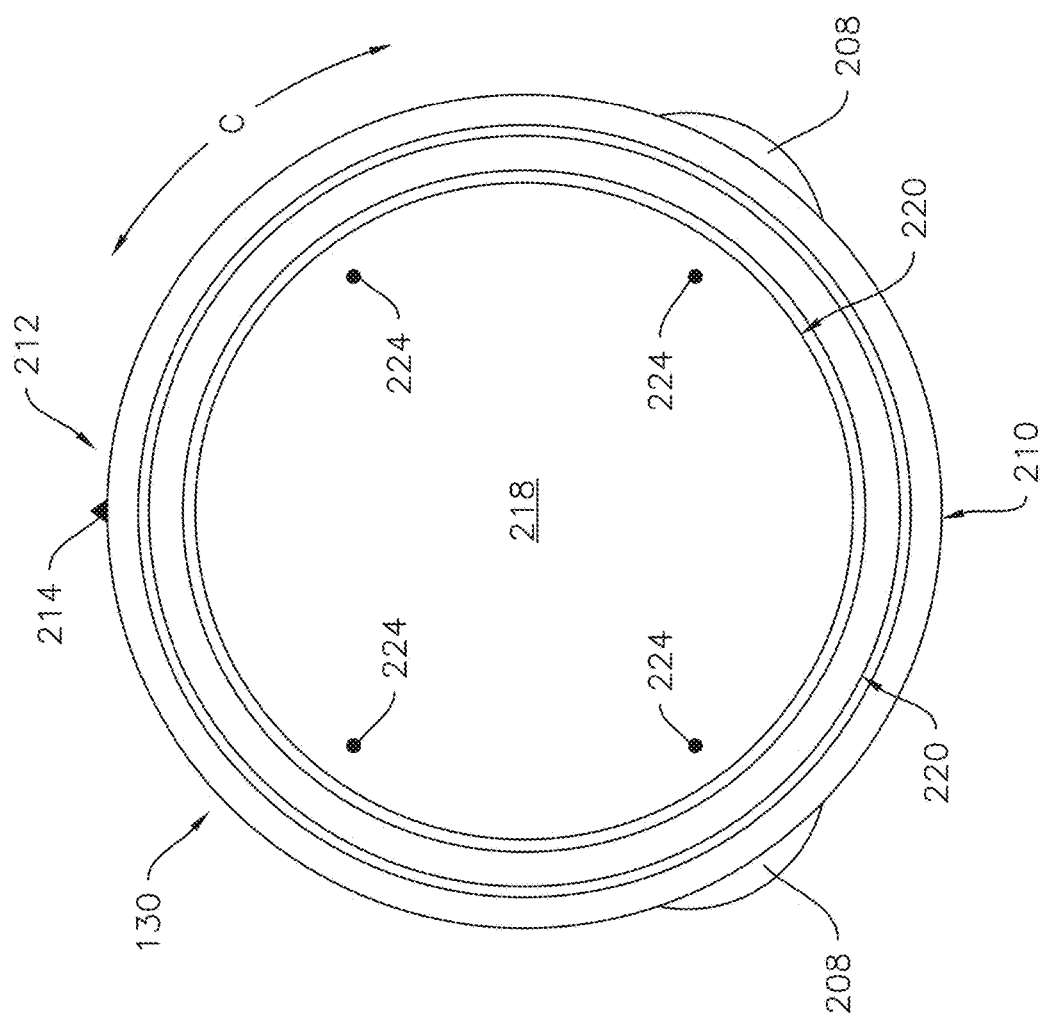
FIG. 20 provides a top-down overhead view of an exemplary turntable and/or lower cooking pan according to one or more example embodiments of the present subject matter.

As mentioned above, the turntable 130 may be rotatably mounted in the cooking cavity 128, and in at least some embodiments, the upper pan 131 may be mounted on the turntable 130 and rotatable with the turntable 130, e.g., simultaneously with the turntable 130. For example, the turntable 130 may be rotatable through a plurality of positions, such as one or more predetermined positions. In some embodiments, e.g., as illustrated in FIG. 20, the turntable 130 may be rounded or generally circular, whereby a circumferential direction C may be defined by a circumference of the turntable 130. As illustrated in FIG. 20, the turntable 130 may include a front 210 and a back 212 diametrically opposite the front 210. For example, the front 210 may be proximate the door 108 and centered within the cooking cavity 128 along the lateral direction L when the turntable 130 is in a home position. The turntable 130 may also include one or more gutters 220 extending along or parallel to (e.g., concentric with) the circumferential direction C, a pair of handles 208 disposed between the front 210 and the back 212 along the circumferential direction C, and a spout 214 disposed at or around the back 212. In some embodiments, the plurality of positions of the turntable 130 may include a plurality of predetermined positions which equally spaced apart along the circumferential direction C. For example, the plurality of positions of the turntable 130 may include four predetermined positions each spaced apart from adjacent positions of the plurality of positions by ninety degrees. As another example, the plurality of positions of the turntable 130 may include eight predetermined positions each spaced apart from adjacent positions of the plurality of positions by forty five degrees.

In various embodiments, the rotation of the turntable 130 may be controlled by software, and may be controlled based on an operating mode of the cooking appliance 100, meal cook sequences, and/or user input. For example, in some embodiments, the turntable 130 may be configured to rotate to a home position when the door 108 is opened, e.g., as mentioned above, where the front 210 of the turntable 130 is proximate the door 108. Additionally, the turntable 130 may be rotatable to a user selected one of the plurality of predefined positions in response to a user input, e.g., via the control panel 118, such as buttons 124 thereon.

In some embodiments, the turntable 130 may rotate through the plurality of positions in a sequential order during at least a portion of the meal cook cycle, e.g., with a constant rotational speed and/or direction through at least the portion of the meal cook cycle. Additionally, in at least some embodiments, the turntable 130 may also be rotated, such as by the motor, to a predetermined one of the plurality of positions at a predetermined time. The predetermined time may correspond to a certain point in the meal cook cycle. For example, in some embodiments, the predetermined time may correspond to an end of the meal cook cycle. In some embodiments, the meal cook cycle may include a plurality of stages, and the predetermined time may correspond to one of the plurality of stages, such as the beginning of a stage, the end of the stage, or an intermediate point during the stage, etc.

The turntable 130 may rotate to the predetermined positions by changing the speed and/or direction of rotation. For example, in some embodiments, rotating the turntable 130 through the plurality of positions in the sequential order during at least the portion of the meal cook cycle may include rotating the turntable at a first speed, and rotating the turntable to the predetermined one of the plurality of positions at the predetermined time may include rotating the turntable at a second speed different from the first speed. As another example, rotating the turntable 130 to the predetermined one of the plurality of positions at the predetermined time may include rotating the turntable 130 through at least one of the plurality of positions out of the sequential order.

Figure 21:
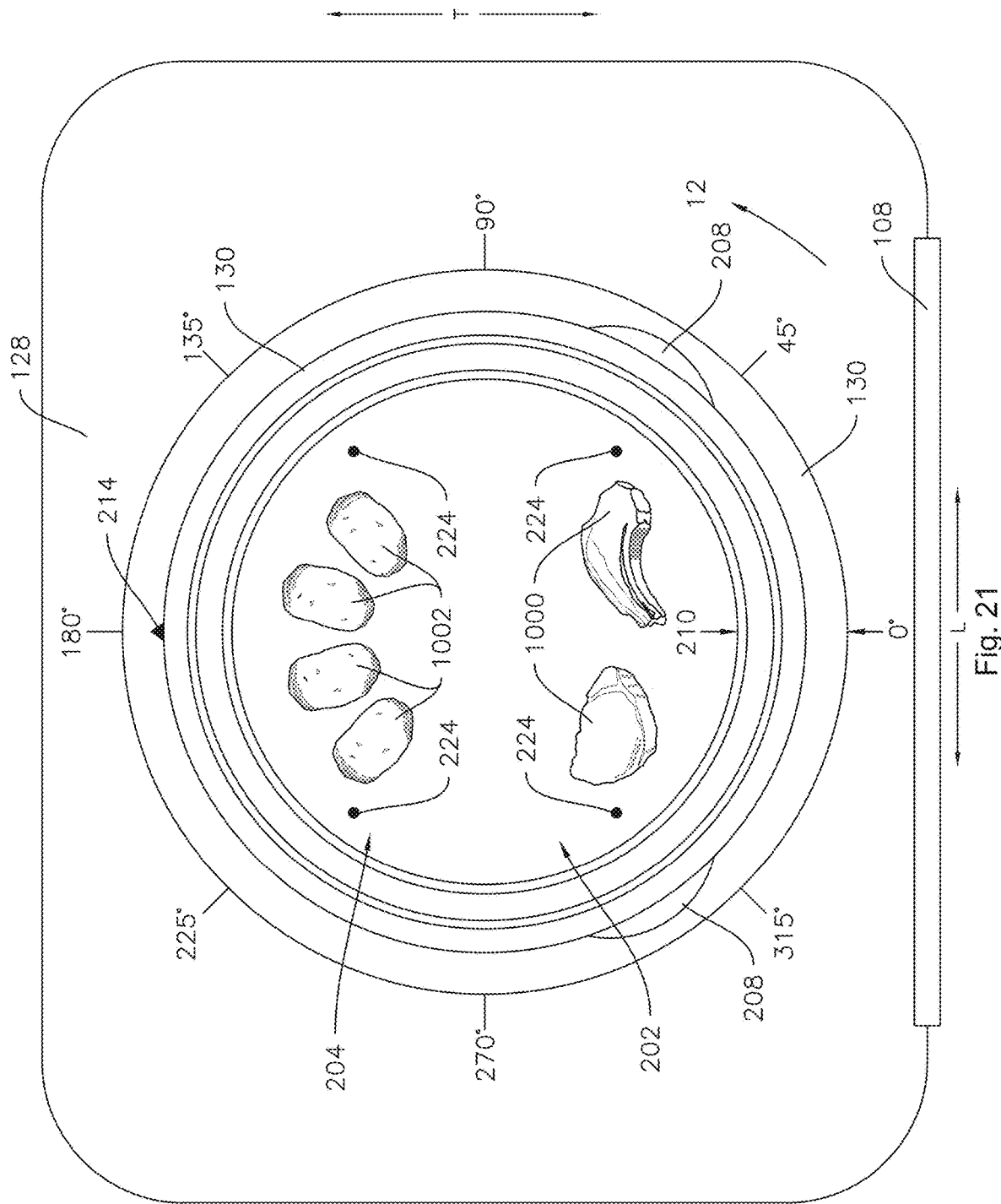
FIG. 21 provides a schematic illustration of an exemplary cooking appliance in a home position according to one or more additional example embodiments of the present subject matter.
Figure 22:
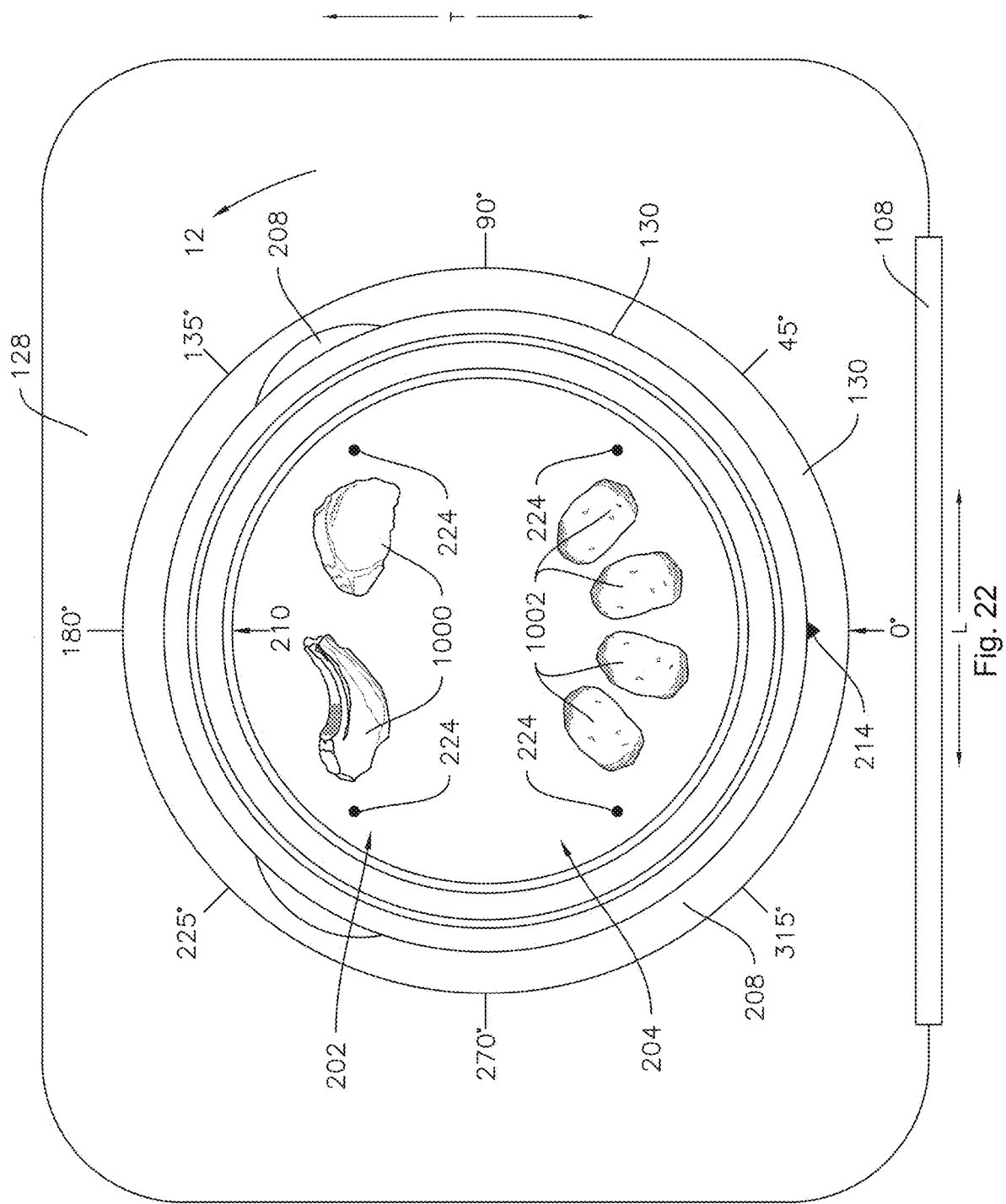
FIG. 22 provides a schematic illustration of an exemplary cooking appliance of FIG. 21 in a back position.

In various embodiments, the turntable 130 and/or upper pan 131 define at least two distinct spatial locations, e.g., the first, second, and third locations 202, 204, and 206 described above. In some embodiments, the turntable 130 may include or define the first location 202 and the second location 204. In such embodiments, the plurality of predetermined positions may include the home position, e.g., as illustrated in FIG. 21, wherein the first location 202 is proximate the door 108 and a back position, e.g., as illustrated in FIG. 22, wherein the second location 204 is proximate the door 108, and the back position may be separated from the home position by about 180°. The home position and the back position may also be included in embodiments where the first and second locations 202 and 204 are defined on the upper pan 131, thus, the discussion therein of first and second locations 202 and 204 on the turntable 130 may also be applied to first and second locations 202 and 204 on the upper pan 131. The back position may be opposite, e.g., diametrically opposite or 180° apart from, the home position. In such embodiments, rotating the turntable 130 to the predetermined one of the plurality of positions at the predetermined time may include rotating the turntable 130 to the home position or the back position. For example, in some embodiments, a first food item, e.g., meat 1000, may be positioned in the first location 202 and a second food item different from the first food item, e.g., potatoes 1002, may be positioned in the second location 204. Thus, rotating the turntable 130 to the home position may include placing the first food item, e.g., meat 1000, proximate to the door 108 to promote access thereto, and rotating the turntable 130 to the back position may include placing the second food item, e.g., potatoes 1002, proximate to the door 108 to promote access thereto. Such positioning facilitates user interaction with a desired food item, such as flipping a piece of meat 1000 or checking doneness of a potato 1002, etc. In some embodiments, the cooking appliance 100, e.g., the controller thereof, may be configured to display, e.g., on the display 120, instructions for a user interaction with a food item in the first location 202 after rotating the turntable 130 to the predetermined home position and/or instructions for a user interaction with a food item in the second location 204 after rotating the turntable 130 to the predetermined back position.

As mentioned above, one or more heating modules of the cooking appliance 100 may be adjusted during the meal cook cycle, and such adjustments may be synchronized with the rotation of the turntable 130 and the upper pan 131. Another example of such operation is illustrated in FIGS. 23 through 26. In particular, in the example operation illustrated in FIGS. 23 through 26, operation of the cooking lamps 138 and 139 may be varied throughout the meal cook cycle to selectively target each location 202 and 204 with the optimal or preferred amount of cooking energy, including activating and/or deactivating each lamp 138 and 139 correspondingly (e.g., synchronized) with the rotation of the turntable 130 and/or the upper pan 131. Only two locations 202 and 204 in a single pan are illustrated in FIGS. 23 through 26 solely for the purposes of simplicity and clarity in the particular example embodiment illustrated, however, such example is not intended to limit the present disclosure to any particular number or configuration of pans and/or locations.

As generally shown throughout FIGS. 23 through 26, the meal cook cycle may include activating the first lamp 138 over a first portion or arc 240 of the rotation of the pan 130 or 131 and activating the second lamp 139 over a second portion or arc 246 of the rotation of the pan 130 or 131. In the particular example illustrated in FIGS. 1 through 30, the majority of the energy from the cooking lamps 138 and 139 is directed to the first location 202. Accordingly, each lamp 138 and 139 is deactivated (e.g., is not on or is turned off) when the second location 204 is more proximate to the lamp 138 or 139 than the first location 202.

Figure 23:
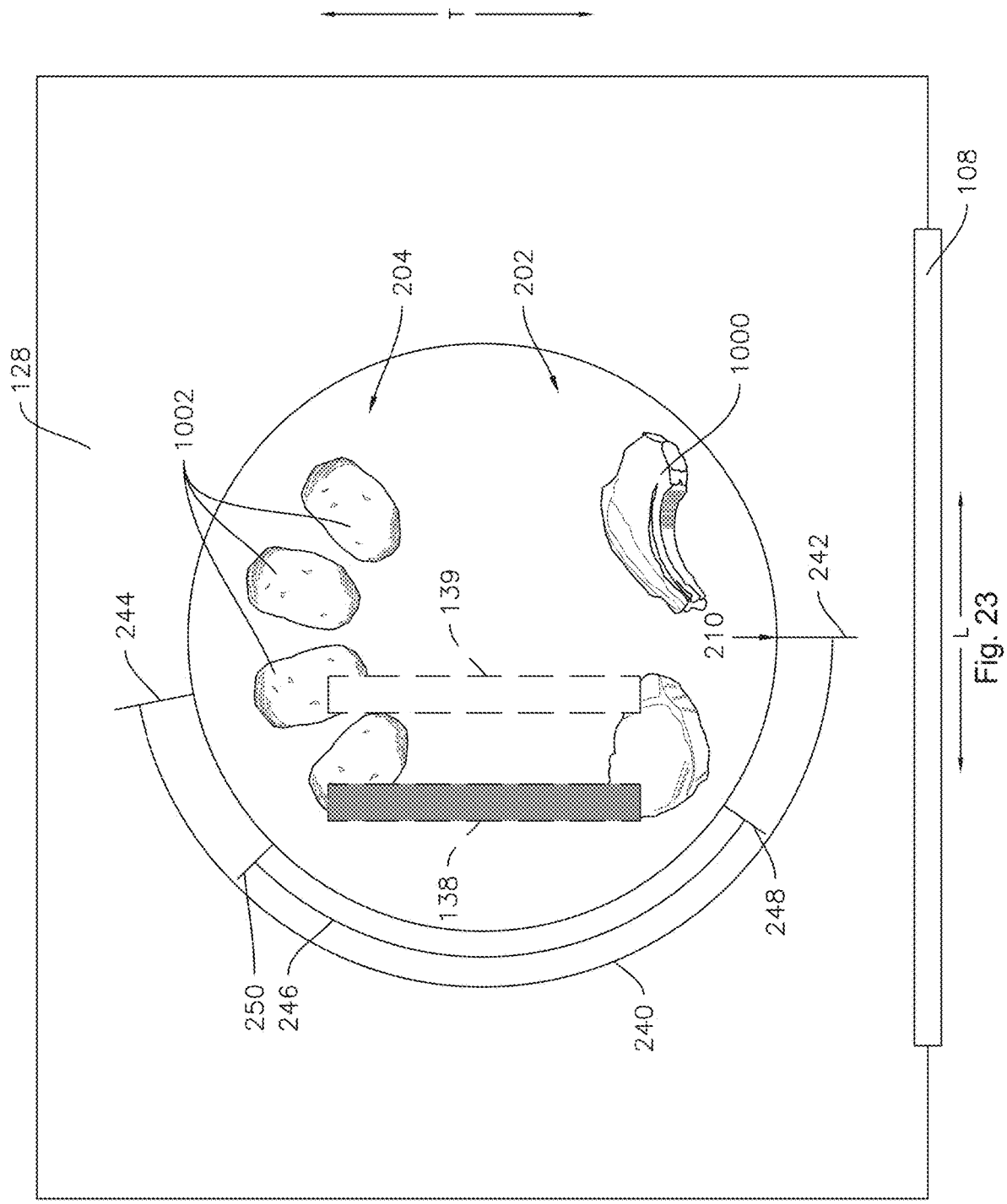
FIG. 23 provides a schematic illustration of an exemplary cooking appliance in a first angular position according to one or more additional example embodiments of the present subject matter.
Figure 24:
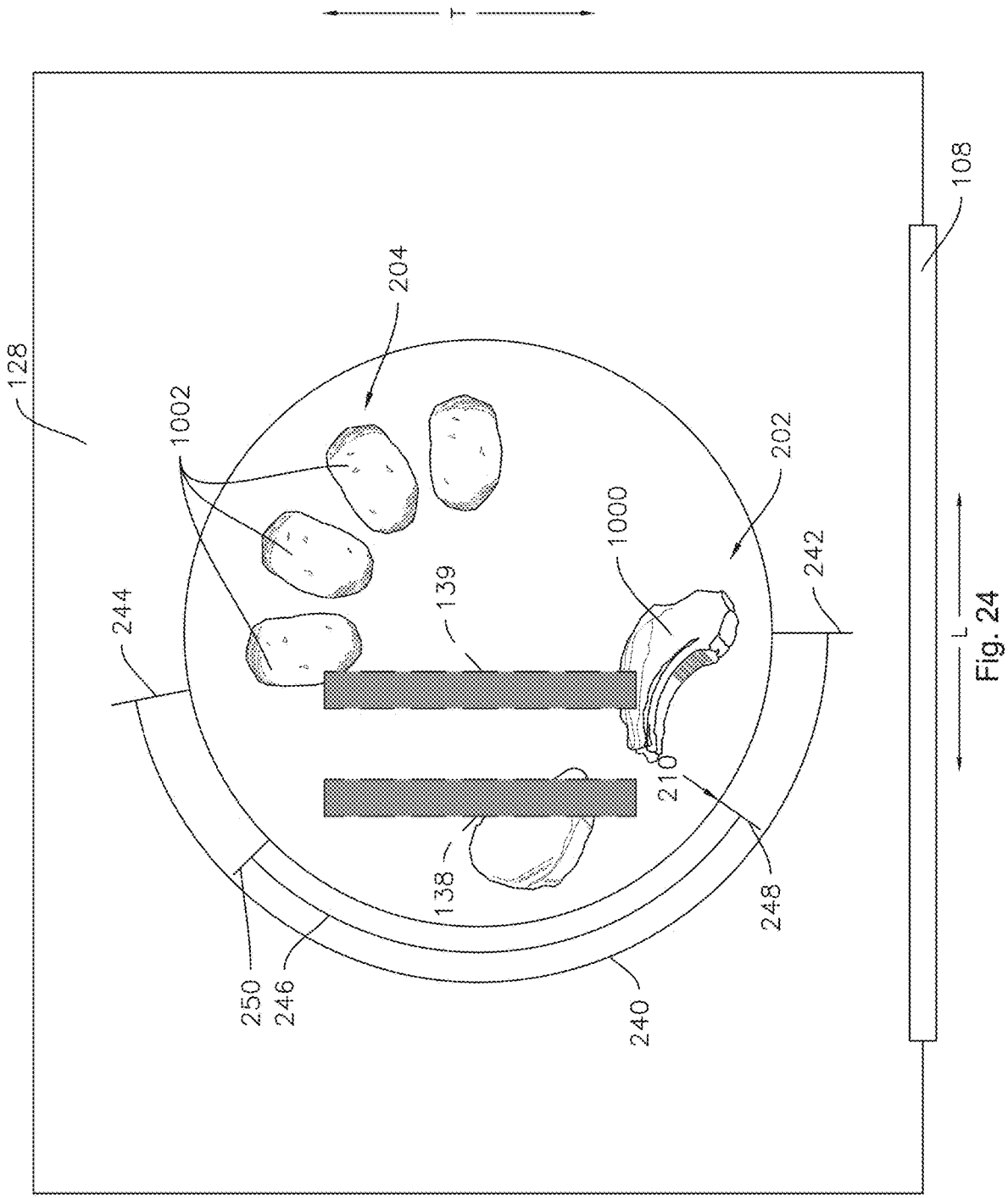
FIG. 24 provides a schematic illustration of the exemplary cooking appliance of FIG. 23 in a second angular position.
Figure 25:
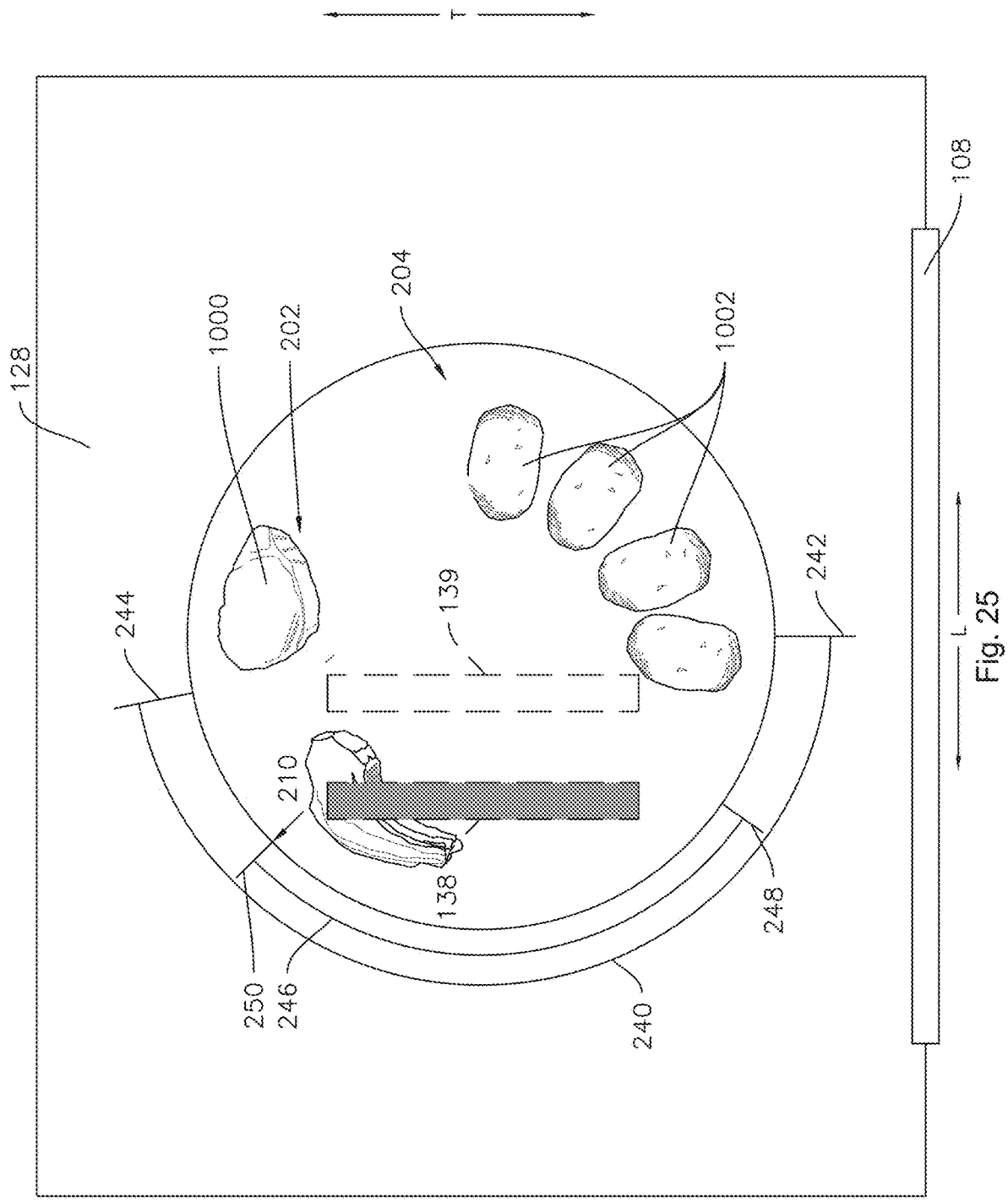
FIG. 25 provides a schematic illustration of the exemplary cooking appliance of FIG. 23 in a third angular position.
Figure 26:
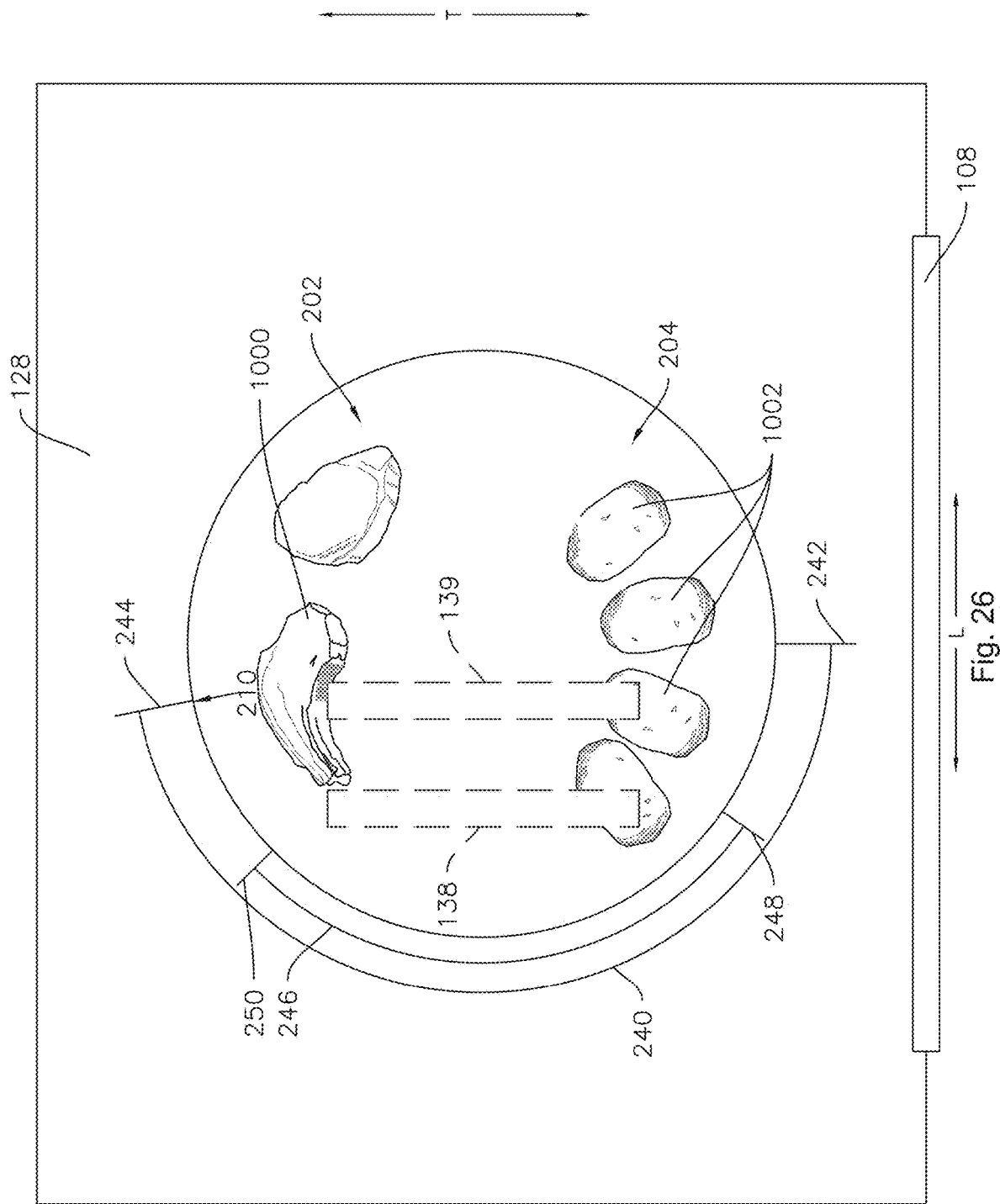
FIG. 26 provides a schematic illustration of the exemplary cooking appliance of FIG. 23 in a fourth angular position.

As shown in FIG. 23, the meal cook cycle may include activating the first cooking lamp 138 when the turntable or pan 130 or 131 is in a first angular position, which, in the illustrated example embodiment, corresponds to the front 210 of the pan 130 or 131 being aligned with a first end 242 of the first arc 240. As shown in FIG. 24, the meal cook cycle may include activating the second cooking lamp 139 (while the first cooking lamp 138 also remains activated) when the turntable or pan 130 or 131 is in a second angular position, which, in the illustrated example embodiment, corresponds to the front 210 of the pan 130 or 131 being aligned with a first end 248 of the second arc 246. As shown in FIG. 25, the meal cook cycle may include deactivating the second cooking lamp 139 (while the first cooking lamp 138 remains activated) when the turntable or pan 130 or 131 is in a third angular position, which, in the illustrated example embodiment, corresponds to the front 210 of the pan 130 or 131 being aligned with a second end 250 of the second arc 246. As shown in FIG. 26, the meal cook cycle may include deactivating the first cooking lamp 138 (while the second cooking lamp 139 remains deactivated) when the turntable or pan 130 or 131 is in a fourth angular position, which, in the illustrated example embodiment, corresponds to the front 210 of the pan 130 or 131 being aligned with a second end 244 of the first arc 246.

Figure 27:
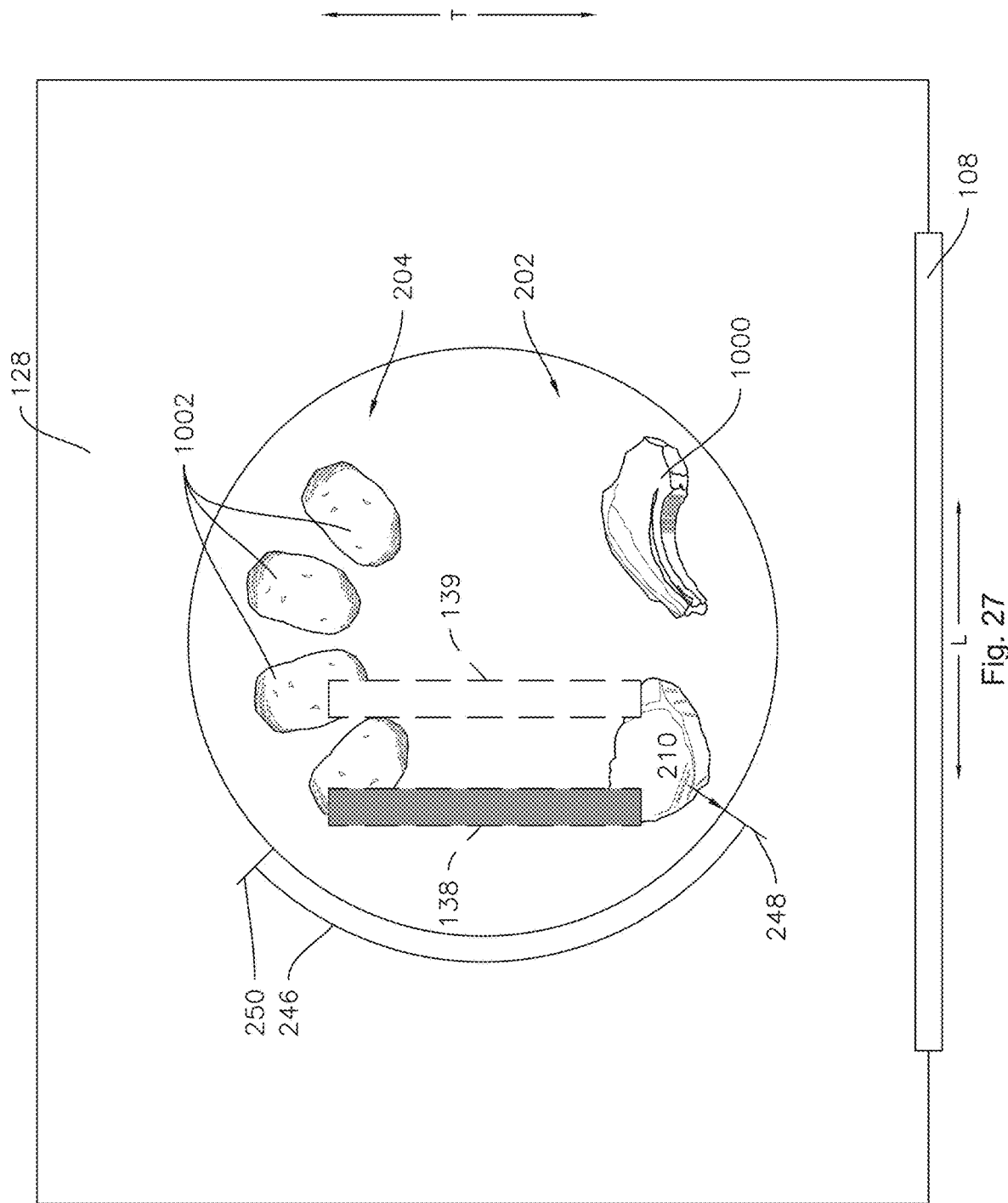
FIG. 27 provides a schematic illustration of an exemplary cooking appliance at a first end of a range of oscillatory motion according to one or more example embodiments of the present subject matter.
Figure 28:
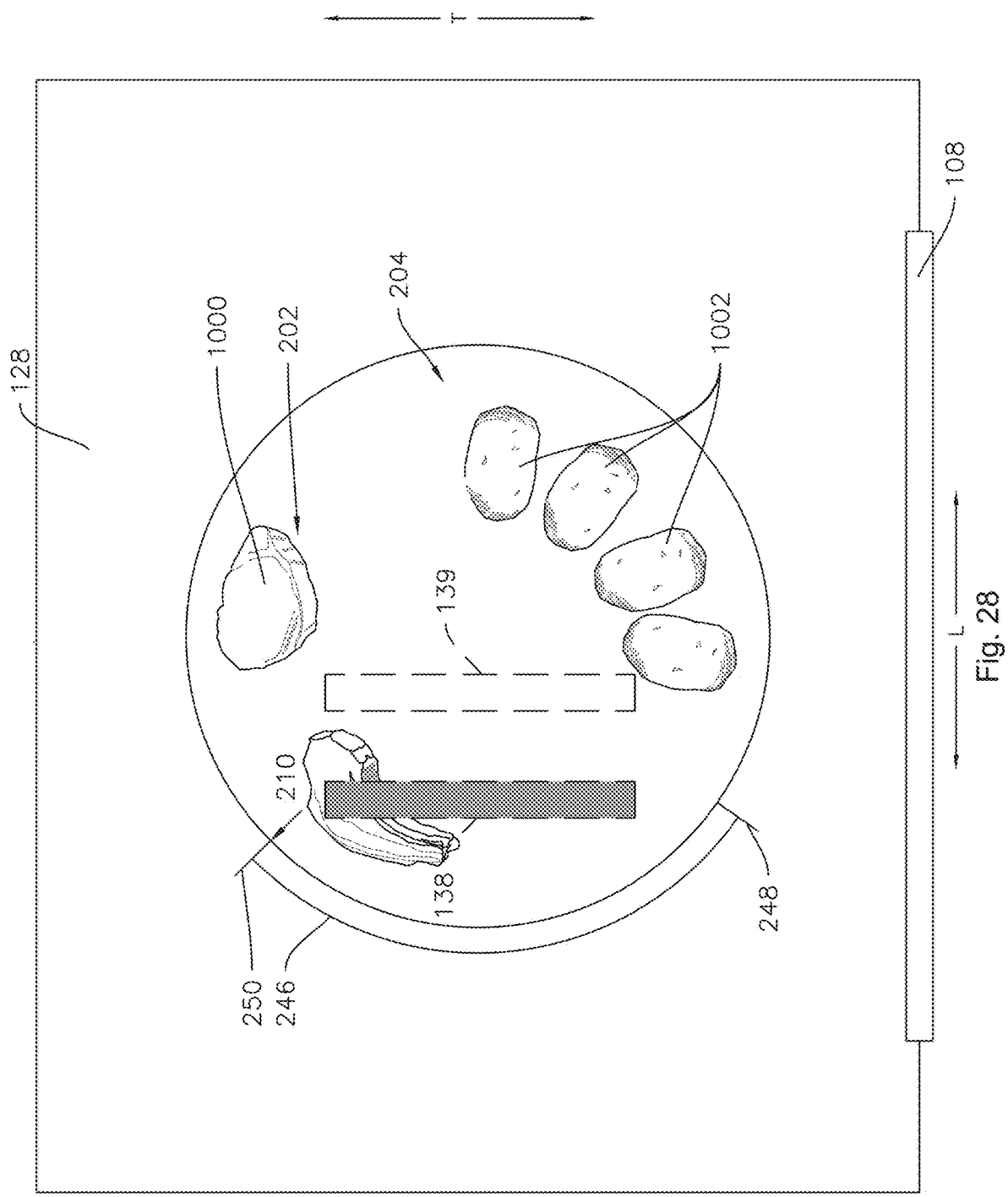
FIG. 28 provides a schematic illustration of the exemplary cooking appliance of FIG. 27 at a second end of the range of oscillatory motion.
Figure 29:
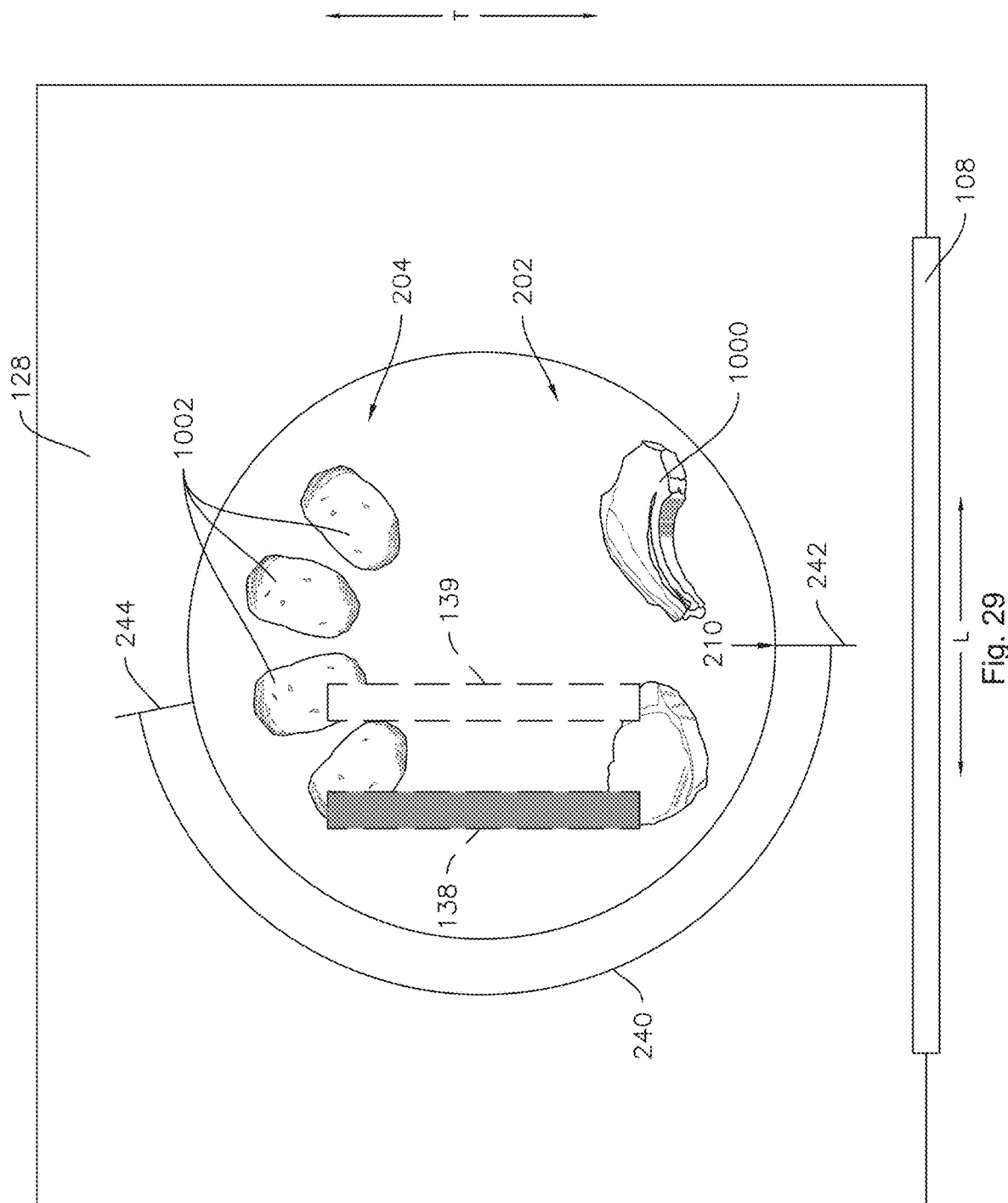
FIG. 29 provides a schematic illustration of an exemplary cooking appliance at a first end of a range of oscillatory motion according to one or more example embodiments of the present subject matter.
Figure 30:
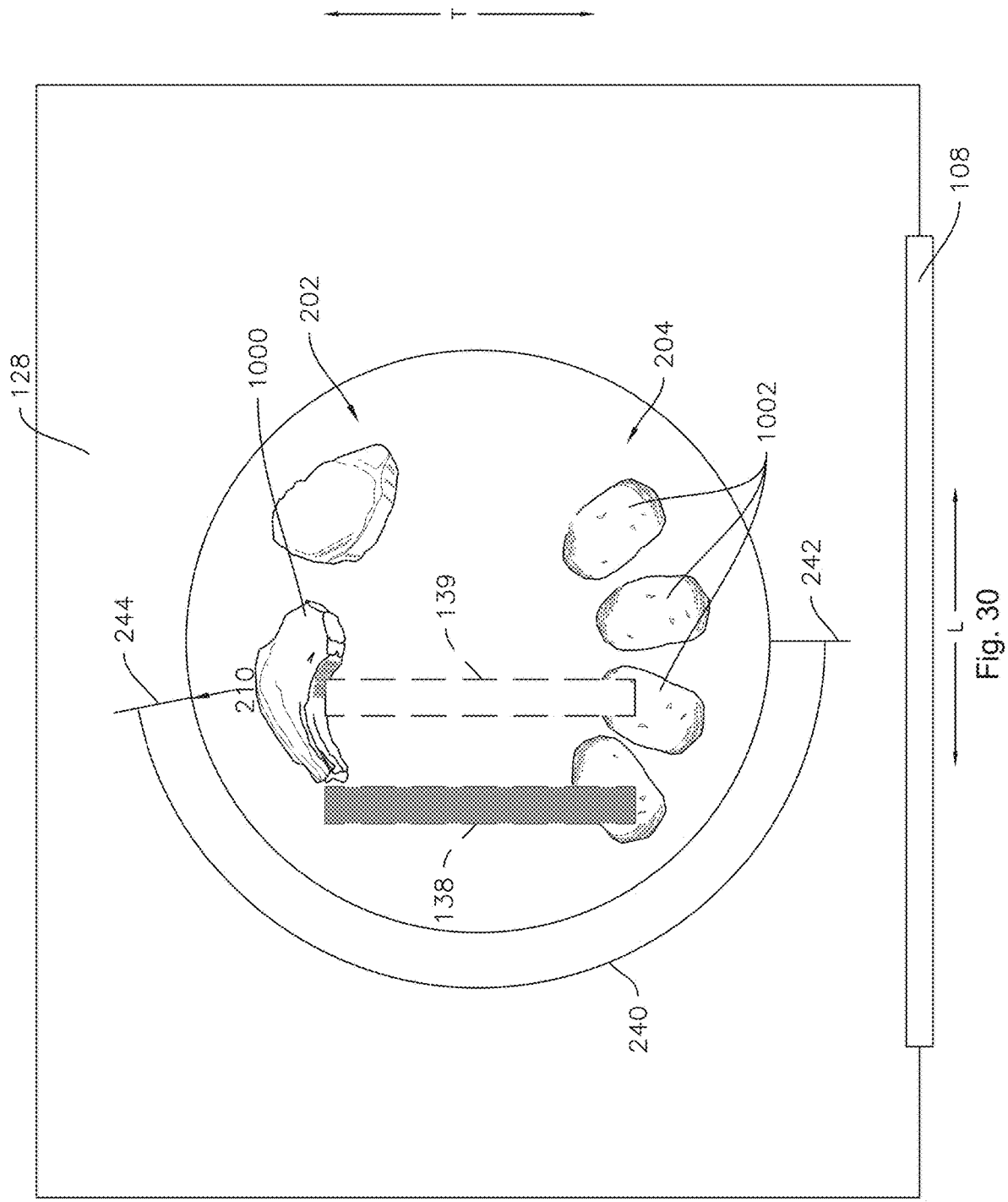
FIG. 30 provides a schematic illustration of the exemplary cooking appliance of FIG. 29 at a second end of the range of oscillatory motion.

As discussed above, e.g., with reference to FIG. 11, the turntable 130 (and, in at least some embodiments, the upper pan 131 mounted thereabove) may be rotatable back and forth, e.g., oscillated, within an angle Θ. FIGS. 27 and 28 illustrate an example embodiment where the oscillation is symmetrical, e.g., the turntable 130 rotates the same amount in each direction, and the oscillation is through an angle Θ subtended by the arc 246. Thus, in some embodiments, the turntable may rotate in the second direction 12 (e.g., FIG. 11) from a first position, where the front 210 is aligned with a first end 248 of the arc 246 (FIG. 27), to a second position, where the front 210 is aligned with a second end 250 of the arc 246 (FIG. 28). In such embodiments, the turntable 130 may then rotate in the first direction 10 (FIG. 11) from the second position shown in FIG. 28 to the first position shown in FIG. 27. FIGS. 29 and 30 illustrate another example embodiment, similar to that described above with respect to the embodiment illustrated in FIGS. 27 and 28, where the oscillation is through an angle Θ subtended by the arc 240.

Figure 31:
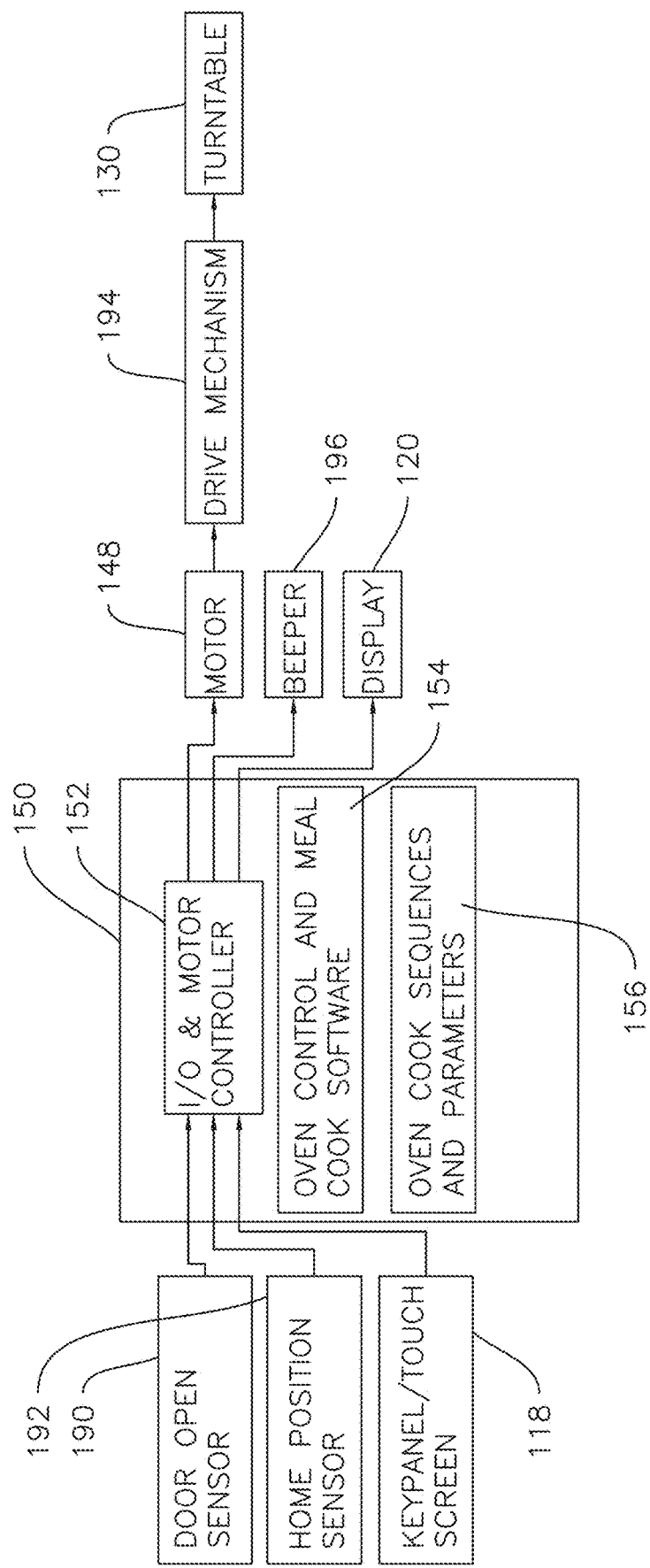
FIG. 31 provides a diagrammatic illustration of exemplary components of a cooking appliance according to one or more example embodiments of the present subject matter.

FIG. 31 provides a diagrammatic illustration of exemplary control and/or sensing components of the cooking appliance 100 according to one or more example embodiments. In embodiments of the present disclosure, the cooking appliance 100 may include one or more (up to and including all) of the illustrated components in FIG. 31 in various combinations. For example, the controller 150 may include an input/output (I/O) motor controller 152, which may be integrated with or provided onboard the controller 150. The I/O motor controller 152 may be operable to set or adjust parameters of the motor 148, such as rotational speed and/or direction, as well as moving the motor 148 to a specific position, e.g., to cause the motor 148 to rotate the turntable 130 (and in at least some embodiments, the upper pan 131 as well) to a predetermined positions such as the home position or back position as described above.

As mentioned above, meal cook cycles and other cooking algorithms can be stored (e.g., preprogrammed during production of the cooking appliance and/or downloaded from a remote database) in a memory device of a controller 150. For example, such algorithms and cycles may be included in or with oven control and meal cook software 154 in the memory of the controller 150. Additionally, oven cook sequences and parameters 156 may be preprogrammed in or loaded onto the memory of the controller 150, and such sequences and parameters may be called upon during one or more exemplary cooking operations, such as meal cook cycles as described herein.

The controller 150 may also be in communication with and receive signals from multiple inputs, such as a key panel and/or touch screen, which may be embodiments of the control panel 118 and/or may be components of the control panel 118 in various embodiments. Additionally, the controller 150 may be in communication with one or more sensors, such as a door open sensor 190 which may, for example, send a signal to the controller 150 when the door 108 of the cooking appliance 100 is open, and a home position sensor 192 which may, for example, send a signal to the controller 150 when the turntable 130 is in the home position. Thus, for example, in some embodiments, the controller 150 may be configured to determine that the door 108 is open, such as based on a signal from the door open sensor 190, and, in response to the door 108 being opened, to move, e.g., rotate, the turntable 130 to the home position. For example, the controller 150 may so move the turntable 130 when the door opening is detected and the turntable 130 is not in the home position.

The controller 150 may also be in communication with and send signals to multiple outputs, such as the motor 148 and, in some embodiments, a drive mechanism 194 to control or adjust the position of the turntable 130, as well as user interface elements. Such user interface elements may be or include a beeper 196 and display 120. In some embodiments, the cooking appliance 100, such as the controller 150 thereof, may be programmed or configured to provide user notifications and/or instructions via the user interface elements such as the beeper 196 and the display 120. For example, in various embodiments, instructions may be provided on the display 120 which correspond to the position of the turntable 130, e.g., when multiple food items are located in various distinct spatial locations throughout the cooking appliance 100, the instructions provided may correspond to relate to the food item(s) in the location which is most proximate to the door 108. One possible example, referring back to FIG. 21, may include providing instructions to flip the meat 1000 when the meat is in the first location 202 and the turntable 130 is in the home position.

Figure 32:
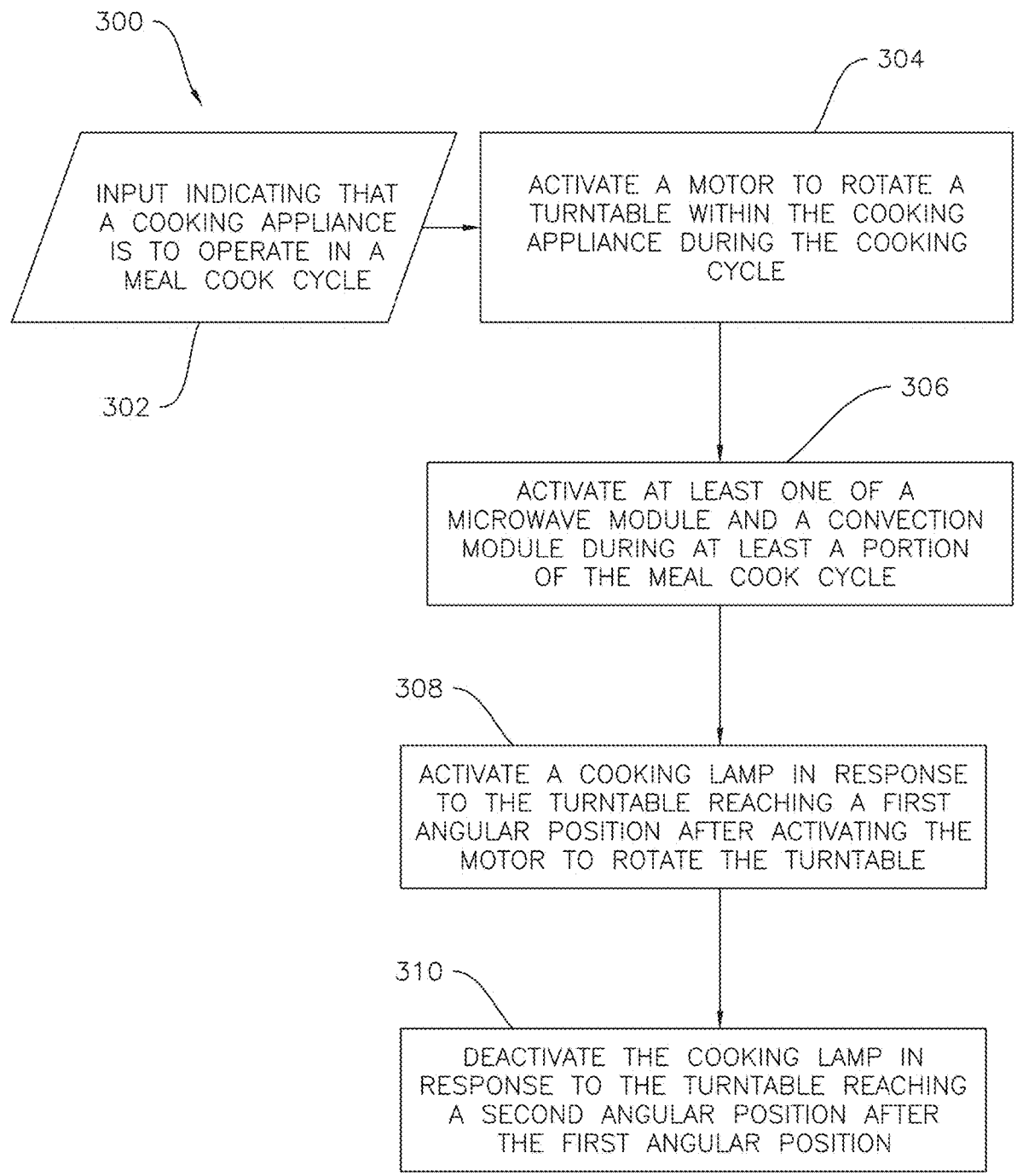
FIG. 32 provides a flow chart diagram illustrating methods of operating a cooking appliance according to one or more example embodiments of the present subject matter.

FIG. 32 provides a flow diagram of an example method 300 of operating a cooking appliance according to an example embodiment of the present subject matter. For instance, cooking appliance 100 described herein can be utilized to implement method 300. Accordingly, to provide context to method 300, the numerals used above to denote various features of cooking appliance 100 will be utilized below. The example method 300 described below provides one example manner in which a cooking appliance can be operated, however, the description below is not intended to be limiting.

At step 302, the method 300 includes receiving, by a controller of the cooking appliance, an input indicating that the cooking appliance is to operate in a meal cook cycle. For instance, the cooking appliance can be the cooking appliance 100 described herein and the controller can be controller 150. After receiving the input at 302, the method 300 may further include a step 304 of activating a motor to rotate a turntable, e.g., turntable 130, and an upper pan, e.g., upper pan 131, within a cooking cavity, e.g., cooking cavity 128, defined in a casing, e.g., casing 102 of the cooking appliance, e.g., cooking appliance 100, during the meal cook cycle.

At step 306, the method 300 includes activating at least one heating module of cooking appliance 100 while the turntable 130 is rotating, and, in some embodiments, while the turntable 130 and the upper pan 131 are rotating. For example, the at least one heating module may be at least one of a microwave module 160, a lower heater module 134, and a convection module 140. The microwave module 160 may be positioned and configured for delivering microwave energy into the cooking cavity 128. The lower heater module 134 may have one or more heating elements. The convection module 140 may include one or more heating elements 142 and a convection fan 144 operable to move air across the one or more heating elements 142 of the convection module 140 and into the cooking cavity 128.

Method 300 may also include, at step 308, activating a cooking lamp, e.g., one or both of cooking lamps 138 and 139 in an upper heater module 132, in response to the turntable reaching a first angular position after activating the motor to rotate the turntable. As shown at 310 in FIG. 15, the method 300 may further include deactivating the cooking lamp in response to the turntable reaching a second angular position after the first angular position. As mentioned above, in some embodiments, the cooking appliance 100 may also include the upper pan mounted to the turntable such that the turntable and the upper pan rotate together, e.g., simultaneously. In such embodiments, the first angular position and the second angular position may be positions of the turntable and the upper pan.

For example, the method 300 may include, in some embodiments, determining the angular position of the turntable based on a status of the motor and/or based on a position sensor, such as a Hall effect sensor, as described above. In such embodiments, the method 300 may include determining that the turntable is in the first angular position prior to activating the cooking lamp and determining that the turntable is in the second angular position prior to deactivating the cooking lamp.

In some embodiments, the first angular position and the second angular position may be spaced apart by an angle of about one hundred eighty degrees, such that the cooking lamp is activated while the turntable rotates through the angle of about one hundred eighty degrees. Additionally, in some embodiments, a second cooking lamp may be provided, e.g., the other of the cooking lamps 138 and 139 in the illustrated example embodiments. In such embodiments where the second cooking lamp is included, the method 300 may further include activating the second cooking lamp in response to the turntable reaching a third angular position and deactivating the second cooking lamp in response to the turntable reaching a fourth angular position. In such embodiments, each of the first angular position, the second angular position, the third angular position, and the fourth angular position may be different from every other of the first angular position, the second angular position, the third angular position, and the fourth angular position. For example, the first and second angular positions may be spaced apart by a first angle, e.g., about one hundred eighty degrees, as mentioned above. The third angular position and the fourth angular position may be spaced apart by a second angle, e.g., less than the first angle, such about sixty degrees or about ninety degrees. In at least some embodiments, the first angle and the second angle may overlap and may be aligned at the center point of each angle. In such embodiments, the first cooking lamp may be activated while the turntable rotates through the first angle, both the first cooking lamp and the second cooking lamp may be activated while the turntable rotates through the second angle, and both the first cooking lamp and the second cooking lamp may be deactivated while the turntable rotates from the second angular position to the first angular position.

In some embodiments, the cooking lamp, e.g., one or both of the exemplary cooking lamps 138 and/or 139, may be off-center, e.g., may be positioned away from a center of the cooking cavity. For example, the cooking lamps may be to the left (from the perspective of a user facing the cooking appliance) of the center of the cooking appliance 100, e.g., such as one or both of the cooking lamps 138 and 139 illustrated in FIGS. 9-11. In embodiments where the cooking lamp is off-center, and particularly when the upper pan 131 is provided and the cooking lamp is at or above the top of the cooking cavity, activating the cooking lamp may provide energy from the cooking lamp predominantly to a single discrete area within the cooking cavity, e.g., such as first distinct spatial location 202 as illustrated in FIGS. 9 and 10. Thus, some exemplary embodiments of a method of operating a cooking appliance may include activating the cooking lamp when a selected one of the plurality of food items is positioned within the single discrete area.

Figure 33:
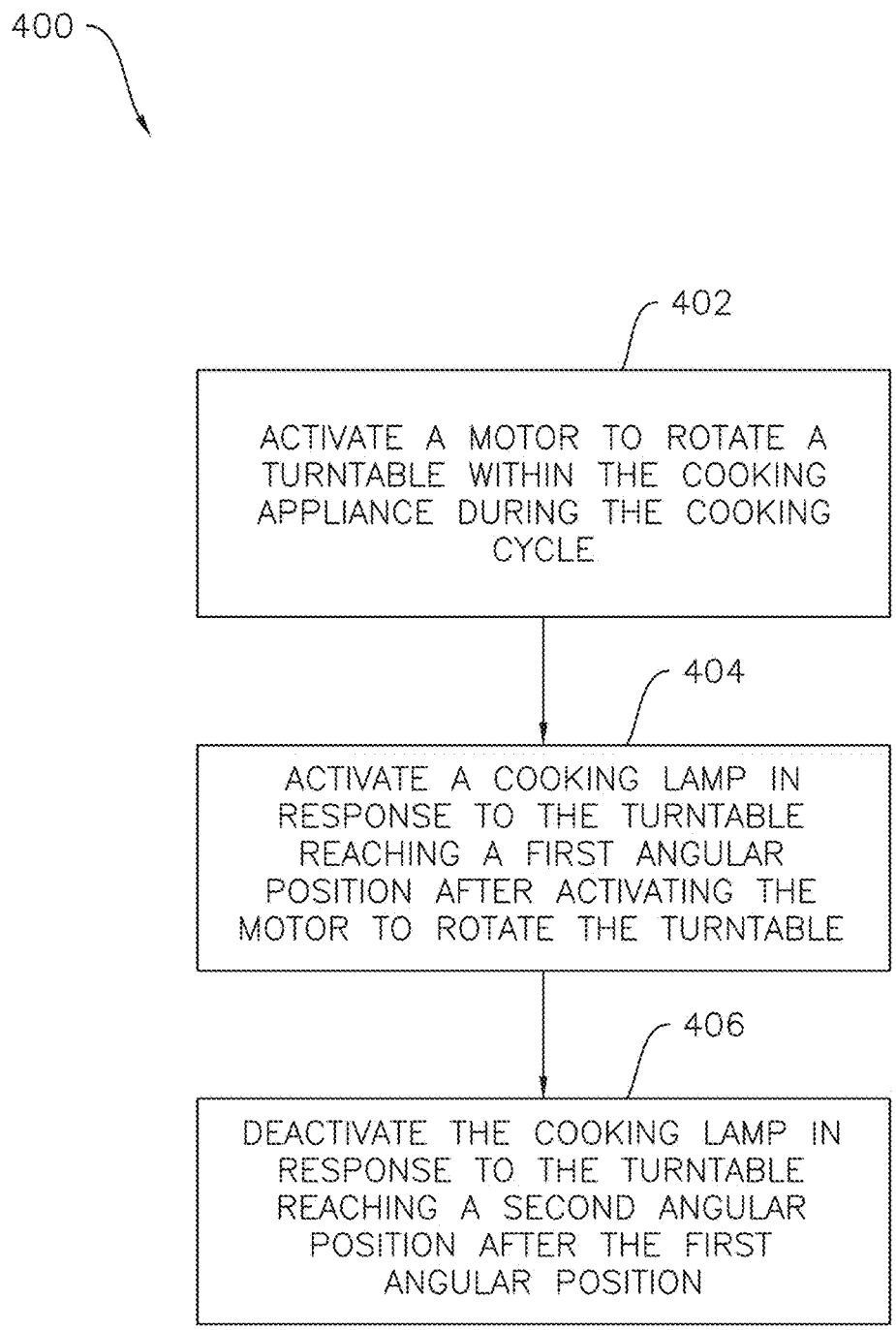
FIG. 33 provides a flow chart diagram illustrating methods of operating a cooking appliance according to one or more additional example embodiments of the present subject matter.

Turning now to FIG. 33, another example method 400 is illustrated according to one or more additional embodiments of the present disclosure. As illustrated, the method 400 may include a step 402 of activating a motor to rotate a turntable within a cooking cavity defined in a casing of the cooking appliance. The method 400 may also include a step 404 of activating a cooking lamp in response to the turntable reaching a first angular position after activating the motor to rotate the turntable and a step 406 of deactivating the cooking lamp in response to the turntable reaching a second angular position after the first angular position. In various embodiments, the method 400 may be a part of a meal cook cycle or may be part of a cooking cycle which uses only the cooking lamp or lamps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a cooking appliance, the method comprising:
   receiving, by a controller of the cooking appliance, an input indicating that the cooking appliance is to operate in a meal cook cycle;
   activating a motor to rotate a turntable within a cooking cavity defined in a casing of the cooking appliance during the meal cook cycle;
   activating at least one of a microwave module for delivering microwave energy into the cooking cavity and a convection module having one or more heating elements and a convection fan operable to move air across the one or more heating elements of the convection module during at least a portion of the meal cook cycle;
   activating a cooking lamp in response to the turntable reaching a first angular position after activating the motor to rotate the turntable; and
   deactivating the cooking lamp in response to the turntable reaching a second angular position after the first angular position.

2. The method of claim 1, wherein the cooking appliance comprises an upper pan mounted to the turntable, wherein activating the motor also causes the upper pan to rotate simultaneously with the turntable.

3. The method of claim 1, wherein the cooking lamp is positioned away from a center of the cooking cavity, whereby activating the cooking lamp provides energy from the cooking lamp predominantly to a single discrete area within the cooking cavity.

4. The method of claim 3, wherein the cooking appliance comprises an upper pan mounted to the turntable, wherein the turntable and the upper pan are configured for positioning a plurality of food items thereon in a predetermined food arrangement, the plurality of food items comprising a meal, wherein the cooking lamp is activated when a selected one of the plurality of food items is positioned within the single discrete area.

5. The method of claim 4, wherein the cooking lamp is positioned above the cooking cavity such that the upper pan is proximate the cooking lamp, wherein the selected one of the plurality of food items is positioned on the upper pan.

6. The method of claim 1, further comprising determining that the turntable is in the first angular position prior to activating the cooking lamp and determining that the turntable is in the second angular position prior to deactivating the cooking lamp.

7. The method of claim 6, wherein determining that the turntable is in the first angular position comprises determining the angular position of the turntable based on a status of the motor, and wherein determining that the turntable is in the second angular position comprises determining the angular position of the turntable based on the status of the motor.

8. The method of claim 1, wherein the first angular position and the second angular position are spaced apart by an angle of about one hundred eighty degrees, whereby the cooking lamp is activated while the turntable rotates through the angle of about one hundred eighty degrees.

9. The method of claim 1, wherein the cooking lamp is a first cooking lamp, wherein the cooking appliance comprises a second cooking lamp, and wherein the method further comprises activating the second cooking lamp in response to the turntable reaching a third angular position and deactivating the second cooking lamp in response to the turntable reaching a fourth angular position, wherein each of the first angular position, the second angular position, the third angular position, and the fourth angular position is different from every other of the first angular position, the second angular position, the third angular position, and the fourth angular position.

10. The method of claim 9, wherein the first angular position and the second angular position are spaced apart by a first angle and wherein the third angular position and the fourth angular position are spaced apart by a second angle, wherein the first angle and the second angle are overlapping, whereby the first cooking lamp is activated while the turntable rotates through the first angle, both the first cooking lamp and the second cooking lamp are activated while the turntable rotates through the second angle, and both the first cooking lamp and the second cooking lamp are deactivated while the turntable rotates from the second angular position to the first angular position.

11. A method of operating a cooking appliance, the method comprising:
activating a motor to rotate a turntable within a cooking cavity defined in a casing of the cooking appliance;
activating a cooking lamp in response to the turntable reaching a first angular position after activating the motor to rotate the turntable; and
deactivating the cooking lamp in response to the turntable reaching a second angular position after the first angular position.

12. The method of claim 11, wherein the cooking appliance comprises an upper pan mounted to the turntable, wherein activating the motor also causes the upper pan to rotate simultaneously with the turntable.

13. The method of claim 11, wherein the cooking lamp is positioned away from a center of the cooking cavity, whereby activating the cooking lamp provides energy from the cooking lamp predominantly to a single discrete area within the cooking cavity.

14. The method of claim 13, wherein the cooking appliance comprises an upper pan mounted to the turntable, wherein the turntable and the upper pan are configured for positioning a plurality of food items thereon in a predetermined food arrangement, the plurality of food items comprising a meal, wherein the cooking lamp is activated when a selected one of the plurality of food items is positioned within the single discrete area.

15. The method of claim 14, wherein the cooking lamp is positioned above the cooking cavity such that the upper pan is proximate the cooking lamp, wherein the selected one of the plurality of food items is positioned on the upper pan.

16. The method of claim 11, further comprising determining that the turntable is in the first angular position prior to activating the cooking lamp and determining that the turntable is in the second angular position prior to deactivating the cooking lamp.

17. The method of claim 16, wherein determining that the turntable is in the first angular position comprises determining the angular position of the turntable based on a status of the motor, and wherein determining that the turntable is in the second angular position comprises determining the angular position of the turntable based on the status of the motor.

18. The method of claim 11, wherein the first angular position and the second angular position are spaced apart by an angle of about one hundred eighty degrees, whereby the cooking lamp is activated while the turntable rotates through the angle of about one hundred eighty degrees.

19. The method of claim 11, wherein the cooking lamp is a first cooking lamp, wherein the cooking appliance comprises a second cooking lamp, and wherein the method further comprises activating the second cooking lamp in response to the turntable reaching a third angular position and deactivating the second cooking lamp in response to the turntable reaching a fourth angular position, wherein each of the first angular position, the second angular position, the third angular position, and the fourth angular position is different from every other of the first angular position, the second angular position, the third angular position, and the fourth angular position.

20. The method of claim 19, wherein the first angular position and the second angular position are spaced apart by a first angle and wherein the third angular position and the fourth angular position are spaced apart by a second angle, wherein the first angle and the second angle are overlapping, whereby the first cooking lamp is activated while the turntable rotates through the first angle, both the first cooking lamp and the second cooking lamp are activated while the turntable rotates through the second angle, and both the first cooking lamp and the second cooking lamp are deactivated while the turntable rotates from the second angular position to the first angular position.

\* \* \* \* \*